United States Patent
Herling et al.

(10) Patent No.: US 9,516,974 B2
(45) Date of Patent: Dec. 13, 2016

(54) CONTAINER FOR LIQUIDS AND SET FOR MAKING THE SAME

(71) Applicant: Precidio Design Inc., Oakville (CA)

(72) Inventors: Nicholas Herling, Toronto (CA); Marc Heinke, Oakville (CA)

(73) Assignee: Precidio Design Inc., Oakville (CA)

( * ) Notice: Subject to any disclaimer, the term of this patent is extended or adjusted under 35 U.S.C. 154(b) by 207 days.

(21) Appl. No.: 14/193,807

(22) Filed: Feb. 28, 2014

(65) Prior Publication Data
US 2014/0174965 A1 Jun. 26, 2014

Related U.S. Application Data

(63) Continuation-in-part of application No. 13/416,461, filed on Mar. 9, 2012.

(51) Int. Cl.
| | | |
|---|---|---|
| A47J 31/00 | (2006.01) | |
| A47J 41/00 | (2006.01) | |
| A47J 31/20 | (2006.01) | |
| A47J 31/06 | (2006.01) | |
| A47J 31/18 | (2006.01) | |

(52) U.S. Cl.
CPC ......... *A47J 41/0077* (2013.01); *A47J 31/0626* (2013.01); *A47J 31/0636* (2013.01); *A47J 31/18* (2013.01); *A47J 31/20* (2013.01)

(58) Field of Classification Search
CPC .... A47J 31/02; A47J 31/0626; A47J 31/0636; A47J 31/20; A47J 31/18
USPC ......... 99/322, 323, 317, 318, 319, 316, 284, 99/391; 220/521, 592.2, 592.27; 210/474
See application file for complete search history.

(56) References Cited

U.S. PATENT DOCUMENTS

| | | | |
|---|---|---|---|
| 1,098,850 A | 6/1914 | Steel | |
| 1,147,632 A | 7/1915 | Lamb | |
| 1,315,624 A | 9/1919 | Fahnestock | |
| 2,127,785 A | 8/1938 | Schimpf | |
| 2,808,167 A | 10/1957 | Polazzolo | |
| 2,856,842 A * | 10/1958 | Schwaneke | A47J 31/053 426/433 |
| 3,181,951 A * | 5/1965 | Gronvold | A47J 31/20 426/431 |
| 3,581,927 A | 6/1971 | Langdon | |
| 4,215,785 A | 8/1980 | Schwaiger | |
| 4,616,758 A | 10/1986 | Zimmermann | |
| 5,046,409 A * | 9/1991 | Henn | A47J 31/0576 99/285 |
| 5,197,602 A | 3/1993 | Biesecker et al. | |
| 5,329,778 A | 7/1994 | Padamsee | |
| 5,775,205 A | 7/1998 | Melton | |
| 5,851,612 A | 12/1998 | Umeda et al. | |
| 6,050,443 A | 4/2000 | Tung | |

(Continued)

Primary Examiner — Reginald L Alexander

(57) ABSTRACT

Components are disclosed as part of a set which may be used to form containers. Components of the set may be interchangeably substituted for one another so that various different possible containers may be made from a set. A set may include an outer vessel having a first cavity, an inner vessel receivable in the first cavity and having a second cavity, a lid assembly removably attachable to the outer vessel, an accessory, a releasable attachment mechanism to removably attach the accessory to the lid assembly so the accessory is received in the first cavity when the lid assembly is attached to the outer vessel, and at least one variant component interchangeable with one of the inner vessel, the lid assembly and the accessory.

24 Claims, 22 Drawing Sheets

(56) References Cited

U.S. PATENT DOCUMENTS

| | | |
|---|---|---|
| 6,202,542 B1 | 3/2001 | Melton |
| 6,284,866 B1 | 9/2001 | Schiavone |
| 6,786,137 B1 | 9/2004 | Shen |
| D505,831 S | 6/2005 | Liu |
| 7,026,027 B2 | 4/2006 | Turner et al. |
| 7,047,983 B2 | 5/2006 | Manougian et al. |
| 7,270,244 B1 | 9/2007 | Liu |
| D560,097 S | 1/2008 | Shen |
| 7,318,374 B2 | 1/2008 | Guerrero |
| D565,353 S | 4/2008 | Roth |
| 7,441,665 B2 * | 10/2008 | Bridges .................... C02F 1/50 210/232 |
| D627,604 S | 11/2010 | Eyal |
| 7,895,939 B2 | 3/2011 | Pan |
| 7,954,661 B2 | 6/2011 | Uchida et al. |
| D652,682 S | 1/2012 | Eyal |
| 8,225,957 B1 | 7/2012 | Volan |
| D669,736 S | 10/2012 | Bodum |
| 8,307,755 B2 * | 11/2012 | Shen ...................... A47J 31/005 220/501 |
| 8,387,517 B2 * | 3/2013 | Geissler .................. A47J 31/20 426/435 |
| D690,161 S | 9/2013 | Garner |
| 8,567,620 B2 | 10/2013 | Ettlin et al. |
| 8,596,480 B2 | 12/2013 | Arjomand |
| RE45,055 E | 8/2014 | Roth et al. |
| 2005/0056610 A1 | 3/2005 | Randolph et al. |
| 2008/0251486 A1 | 10/2008 | Housley et al. |
| 2009/0178573 A1 | 7/2009 | Pan |
| 2010/0108693 A1 | 5/2010 | Zhang et al. |
| 2010/0263549 A1 * | 10/2010 | Lee ........................ A47J 31/18 99/319 |
| 2011/0056386 A1 | 3/2011 | Taketani |
| 2011/0226802 A1 | 9/2011 | Moore et al. |
| 2012/0006830 A1 | 1/2012 | Larreau |
| 2013/0233178 A1 | 9/2013 | Herling et al. |

* cited by examiner

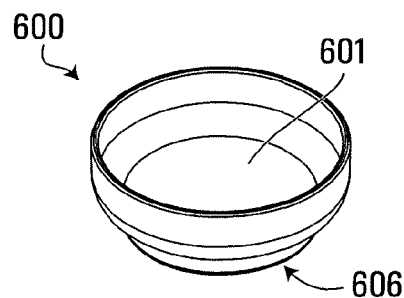
FIG. 3A
FIG. 3B  FIG. 3C
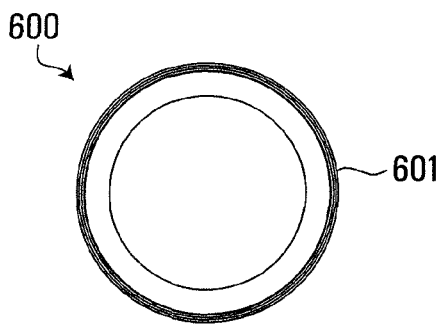 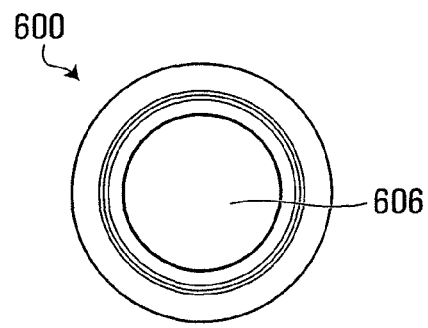
FIG. 3D  FIG. 3E

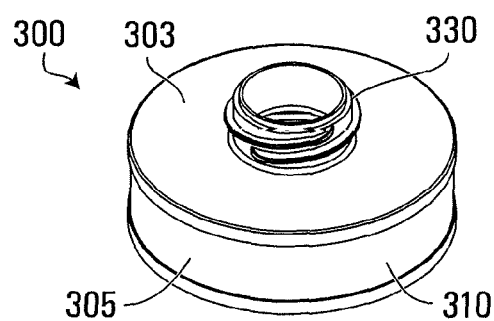
FIG. 5A
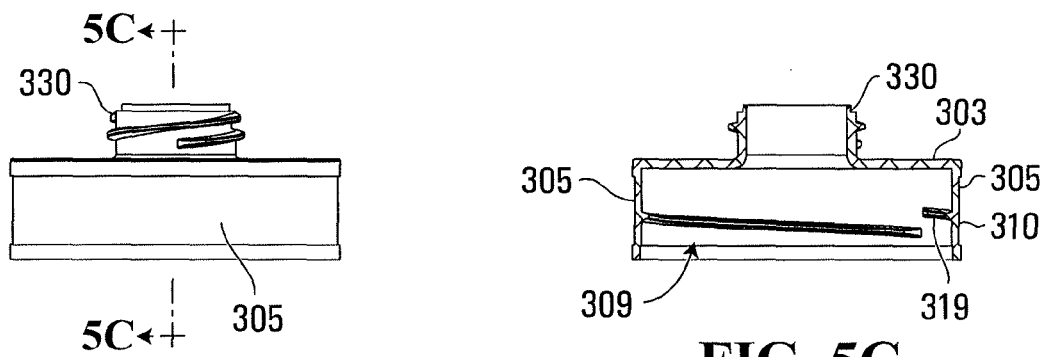
FIG. 5B  FIG. 5C
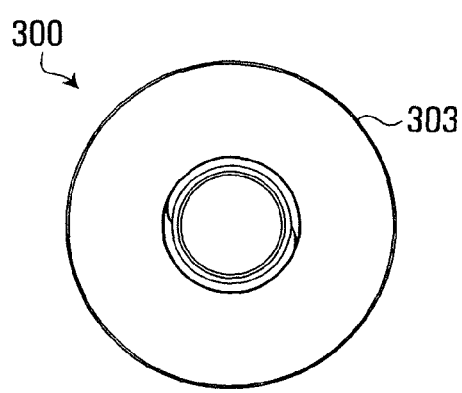 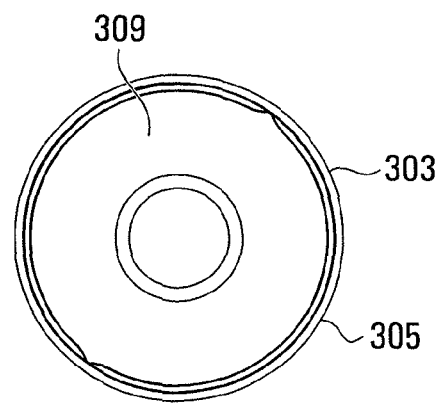
FIG. 5D  FIG. 5E

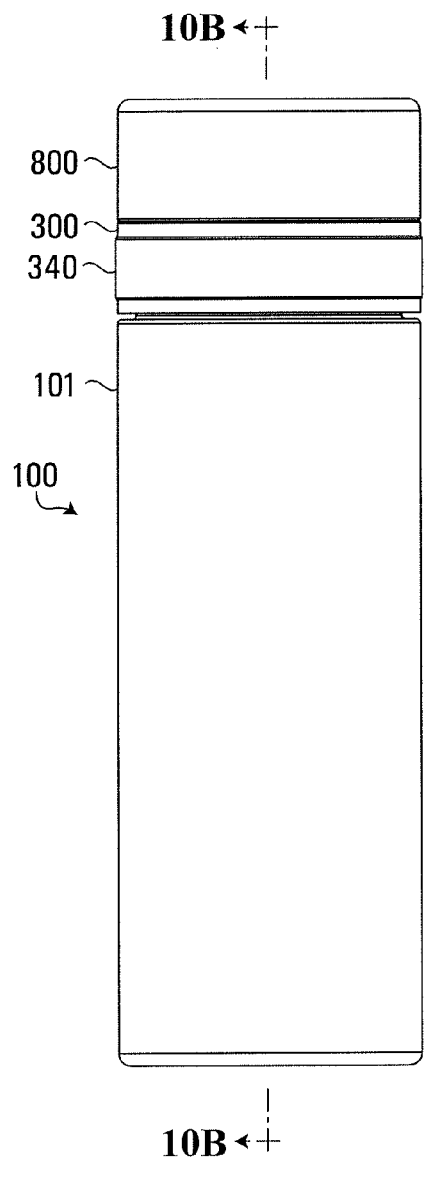
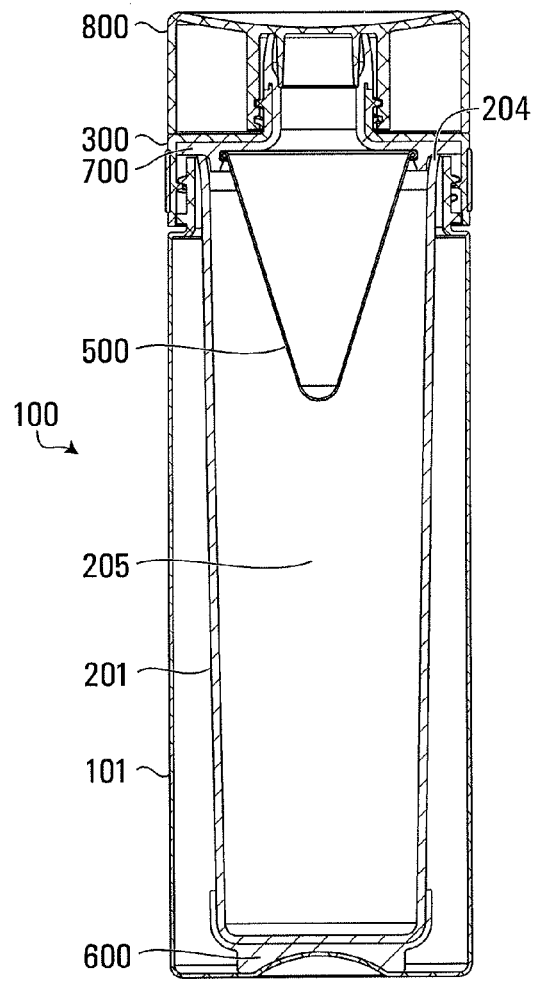
FIG. 10A
FIG. 10B

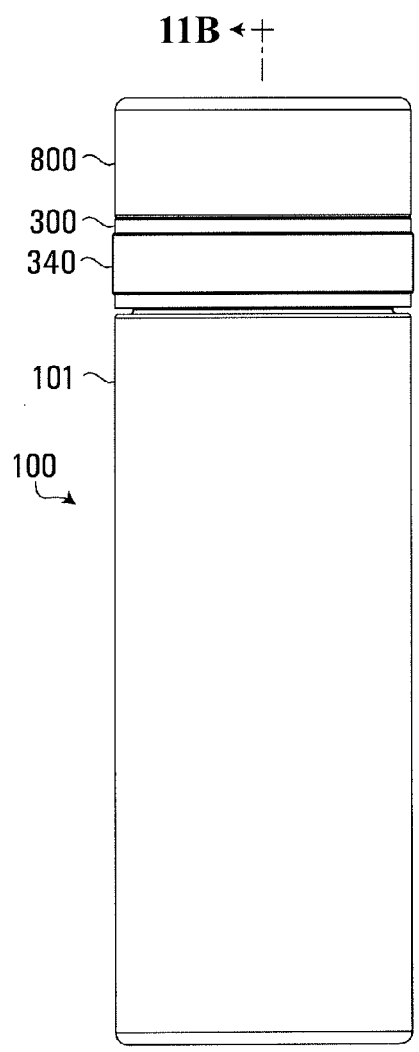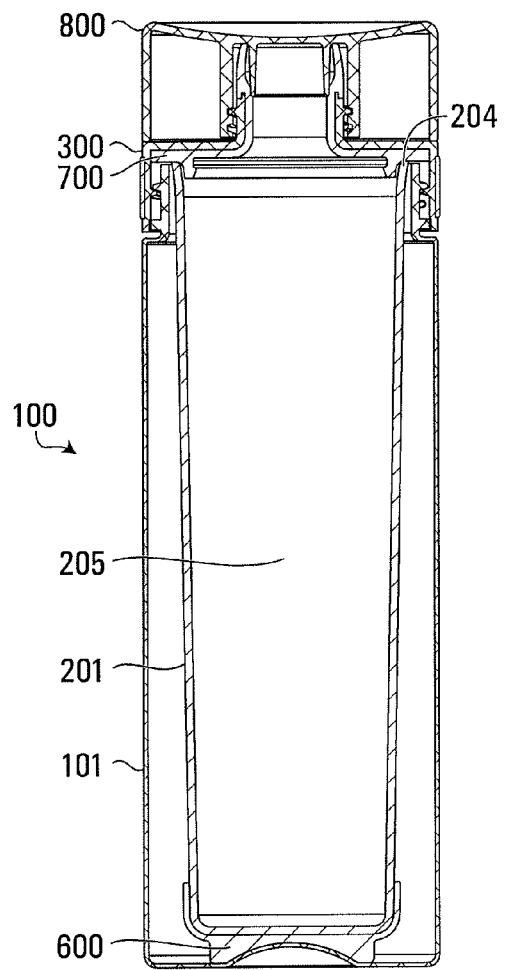
FIG. 11A
FIG. 11B

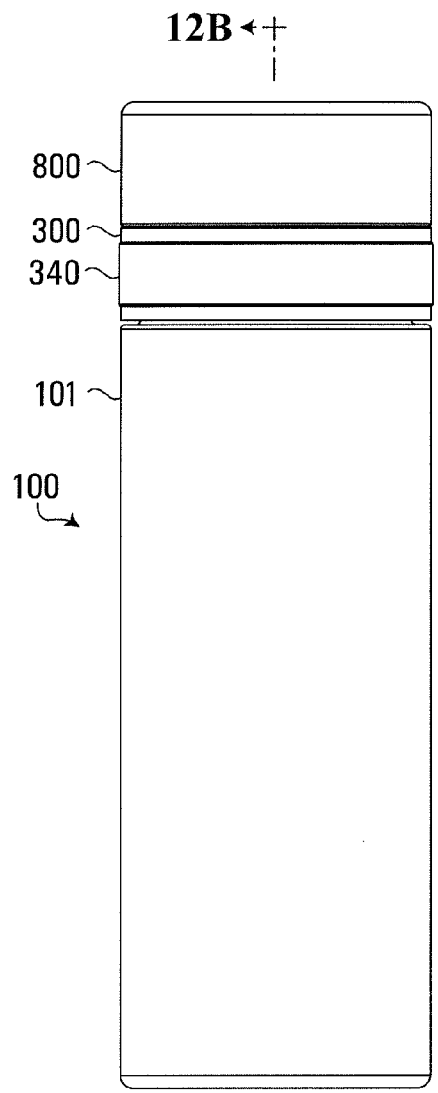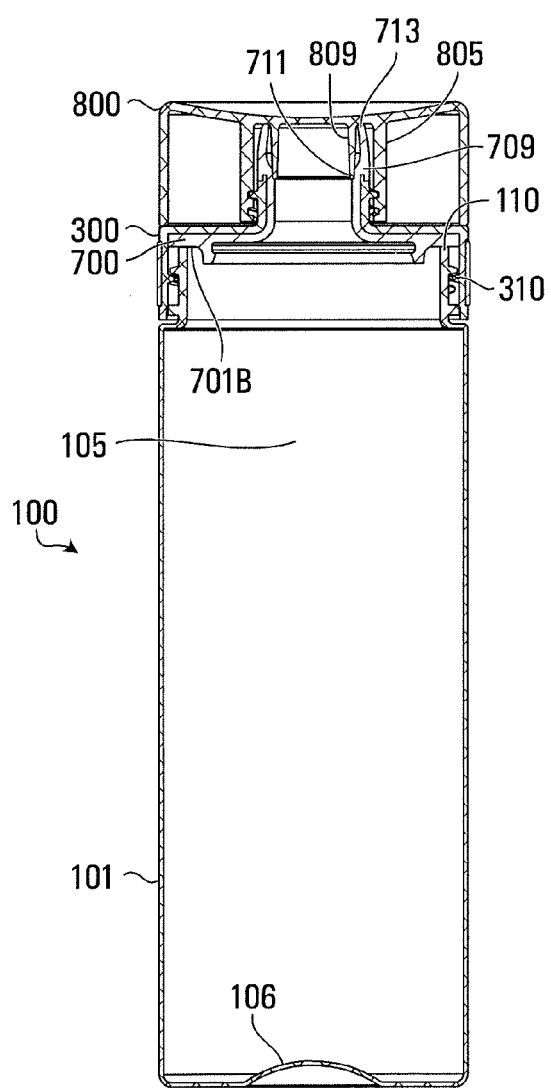
FIG. 12A
FIG. 12B

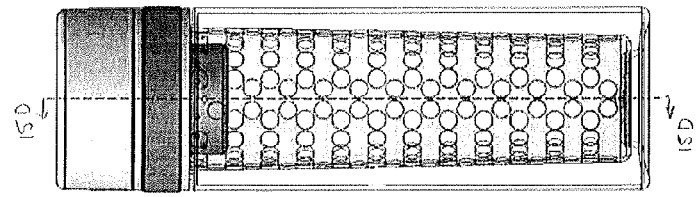
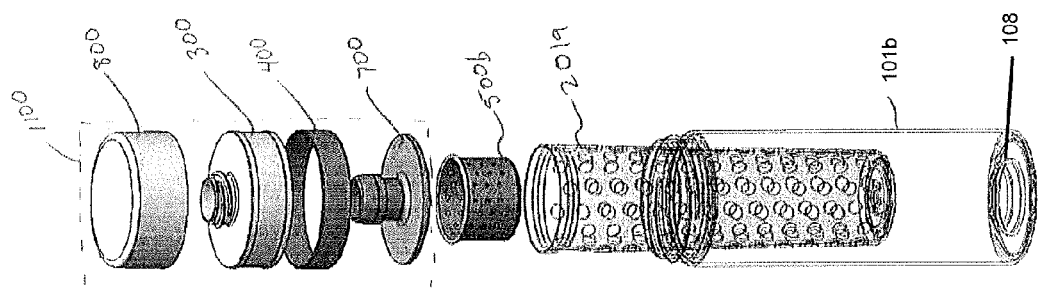
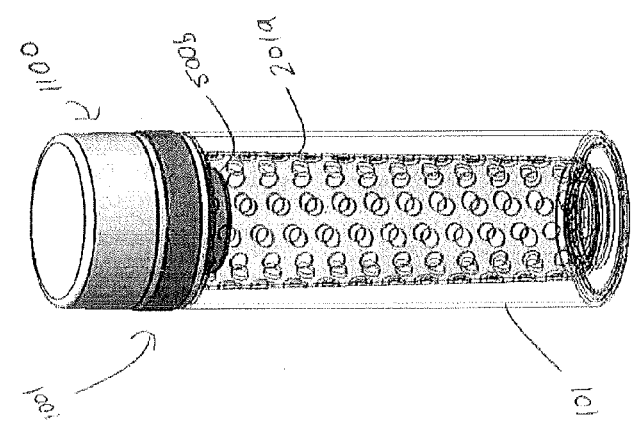

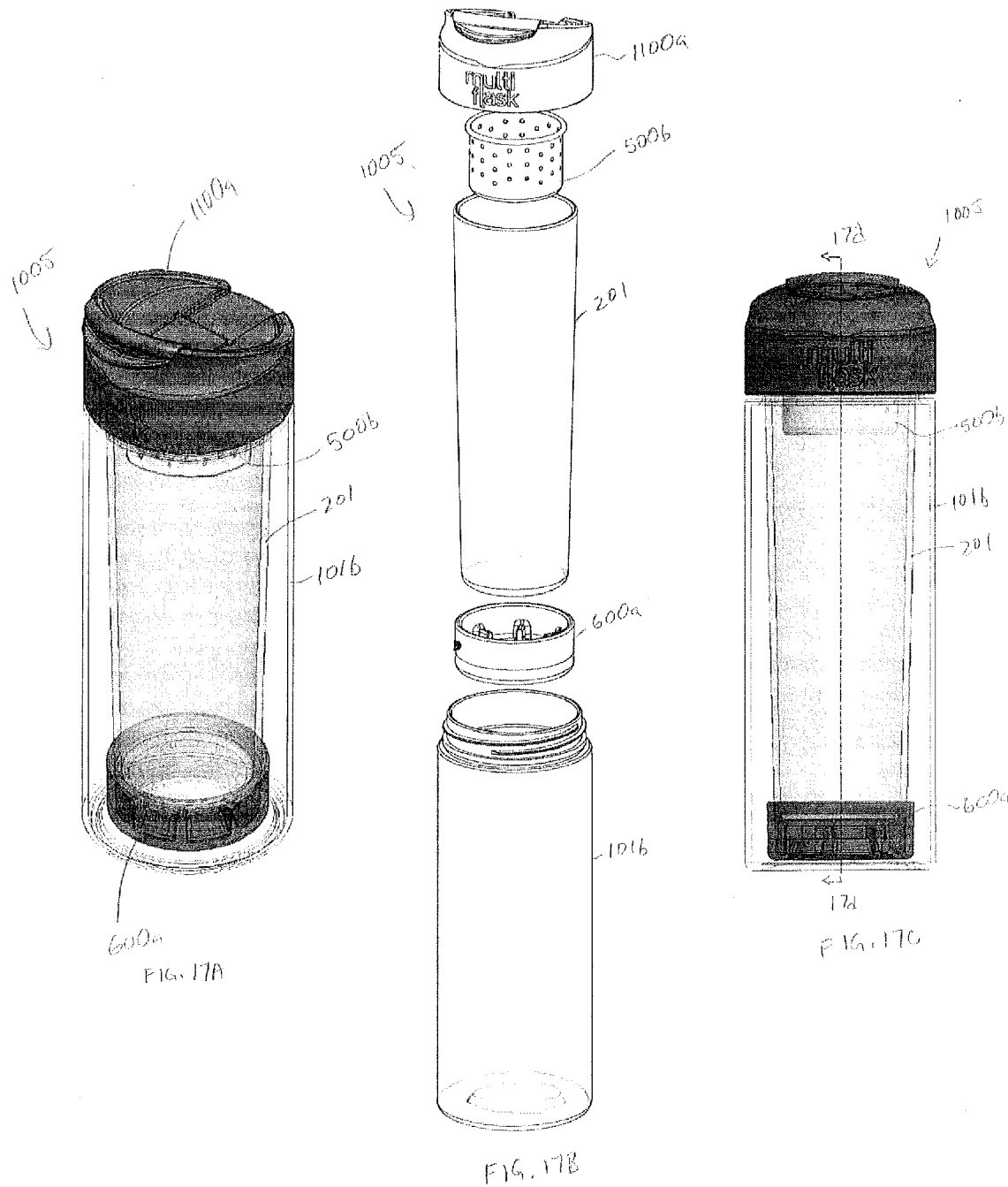

CONTAINER FOR LIQUIDS AND SET FOR MAKING THE SAME

CROSS-REFERENCE TO RELATED APPLICATIONS

This application is a continuation-in-part application of U.S. patent application Ser. No. 13/416,461 filed Mar. 9, 2012, the entire contents of which are hereby incorporated herein by reference.

FIELD

This invention relates to containers for liquids, including containers that can be used for multiple purposes, and sets for making such containers. Such containers include beverage containers that can be assembled in more than one configuration to be used for different purposes. For example a container is disclosed that can be used as a simple beverage bottle; as a beverage bottle that can be used to hold a hot/cold beverage; and as a bottle that can be specially configured to serve as a tea flask. Sets are disclosed including interchangeable components that can be assembled to form a plurality of different containers.

BACKGROUND

Containers that are used to hold various types of liquids are well known. Some such containers are specifically intended to be used to hold a beverage of some kind. A person can access the beverage in the container when they wish to consume the beverage. Some such beverage containers are specifically adapted to be used by persons who wish to hold a cold beverage or a beverage that is at the same temperature as the environment in them. Such containers may be used by an athlete or other person engaged in an exercise activity. Such a beverage bottle may be used by a person during or after physical activity by the person. Often such containers are made of materials such as metals or hard plastics that can resist breakage when subjected to at least a moderate impact force.

Other containers are adapted for specific use to hold hot or cold liquids such as containers for use in holding hot beverages. One of the desirable features of the material used that is in contact with the liquid is that the container material will remain inert at elevated temperatures. Glass has been used as an inert material in constructing hot beverage containers. The holding of beverages in glass containers is considered desirable by many consumers of beverages. However, glass is brittle and particularly prone to breakage when subject to impact forces.

It is known to construct a relatively breakage-resistant container that is specifically adapted to hold a hot beverage. By way of example, in some such composite containers, a glass inner vessel is encased within a hard outer shell. The hard outer shell provides some level of protection for the glass inner vessel. Such containers can readily hold both hot and cold beverages within the inner glass vessel. Due to their construction, such containers are relatively good in reducing pace of the loss of temperature of hot drinks and the pace of the increase in temperature of cold drinks, towards the temperature of the environment. However, they may still to some degree be prone to breakage, particularly when used in an environment where a person is engaged in physical activity where the risk to an impact force is increased compared to normal use.

Also, when constructing containers for holding liquids, there are other design considerations that may have to be taken into account. For example, providing a re-sealable container that can be used multiple times raises challenges. Also, providing containers that employ materials that are considered to be safe from a human/animal health perspective may also be important, particularly for beverage containers.

Improvements in known liquid containers are desired.

SUMMARY

According to one aspect of the present invention there is provided a container comprising: an outer vessel having an inner cavity, the inner cavity of the outer vessel having an opening; an inner vessel having an inner cavity, the inner cavity of the inner vessel having an opening; the inner vessel and the outer vessel being configured for receiving all or substantially all of the inner vessel through the opening of the outer vessel into the inner cavity of the outer vessel such that in operation, the opening of the inner vessel may be releasably positioned proximate the opening of the outer vessel; a lid for releasably enclosing the inner vessel within the outer vessel.

According to another aspect of the present invention there is provided a container comprising: an outer vessel having a bottom wall for supporting the outer vessel, an inner cavity defined at least in part by an inner surface of the bottom wall and an inner surface of a side wall, the inner cavity of the outer vessel having a top opening; an inner vessel having an inner cavity defined at least in part by an inner surface of a side wall, the inner cavity of the inner vessel having a top opening; the inner vessel and the outer vessel being configured for receiving all or substantially all of the inner vessel through the top opening of the outer vessel into the inner cavity of the outer vessel such that in operation, the top opening of the inner vessel may be releasably positioned proximate the top opening of the outer vessel; a lid for releasably enclosing the inner vessel within the outer vessel.

According to another aspect of the present invention there is provided a container comprising: an outer vessel having an inner cavity, the inner cavity of the outer vessel having an opening; an inner vessel having an inner cavity, the inner cavity of the inner vessel having an opening; the inner vessel and the outer vessel being configured for receiving all or substantially all of the inner vessel through the opening of the outer vessel into the inner cavity of the outer vessel such that in operation, the top opening of the inner vessel may be releasably positioned proximate the top opening of the outer vessel; a lid for releasably enclosing the inner vessel within the outer vessel, the lid having an inner cavity, and for enclosing the inner cavity of the outer vessel when the inner vessel is not located within the outer vessel; a sealing device disposed within the inner cavity of the lid, the sealing device being configured for providing (a) a seal between the opening to the inner cavity of the inner vessel and the lid when the inner vessel is located within the inner cavity of the outer vessel and (b) a seal between the opening to the inner cavity of the outer vessel and the lid when the inner vessel is not located within the inner cavity of the outer vessel.

According to another aspect of the present invention there is provided a method of using a container, the container comprising: an outer vessel having an inner cavity, the inner cavity of the outer vessel having an opening; an inner vessel having an inner cavity, the inner cavity of the inner vessel having an opening; the inner vessel and the outer vessel being configured for receiving all or substantially all of the inner vessel through the opening of the outer vessel into the inner cavity of the outer vessel such that in operation, the top opening of the inner vessel may be releasably positioned proximate the top opening of the outer vessel; a lid for releasably enclosing the inner vessel within the outer vessel; wherein the method comprises: (i) filling the inner vessel with a hot or cold beverage; (ii) inserting the inner vessel into the outer vessel through the opening into the inner cavity; (iii) securing the lid to hold the inner vessel within the inner cavity of the outer vessel.

According to another aspect of the present invention there is provided a container kit, comprising: an outer vessel having a first cavity, the first cavity having an opening; an inner vessel having a second cavity, the second cavity having an opening, the inner vessel configured to be receivable in the first cavity such that the opening of the second cavity is positioned proximate the opening of the first cavity; a lid assembly adapted to be removably attachable to the outer vessel; a plurality of different interchangeable accessories; a releasable attachment mechanism operable to interchangeably and removably attach each of the plurality of different interchangeable accessories to the lid assembly such that any selected one of the plurality of different interchangeable accessories may be releasably attached to the lid assembly such that the selected accessory is received in the first cavity when the lid assembly is attached to the outer vessel. According to another aspect of the present invention there is provided a container kit, comprising: an outer vessel having a first cavity, the first cavity having an opening; a plurality of different interchangeable inner vessels, each having an second cavity having an opening, wherein each one of the different interchangeable inner vessels is configured to be receivable in the first cavity so that a selected one of the different interchangeable inner vessels can be received in the first cavity with the opening of the second cavity positioned proximate the opening of the first cavity; a lid assembly adapted to be removably attachable to the outer vessel; a releasable attachment mechanism operable to removably attach the accessory to the lid assembly so that the accessory is received in the first cavity when the lid assembly is attached to the outer vessel.

According to another aspect of the present invention there is provided a container kit, comprising: an outer vessel having a first cavity and an outer vessel opening; an infusion vessel having a wall defining a second cavity and an inner vessel opening, the infusion vessel configured to be received through the outer vessel opening and supported on the outer vessel such that the inner vessel opening is positioned proximate the outer vessel opening, the wall comprising a plurality of holes in fluid communication with the second cavity; a lid assembly comprising an accessory retainer and adapted to be removably attachable to the outer vessel to seal the outer vessel opening and the inner vessel opening; an accessory comprising a retention element configured to engage the accessory retainer to removably attach the accessory to the lid assembly so that the accessory is received through the outer vessel opening when the lid assembly is attached outer vessel.

According to another aspect of the present invention there is provided a container, comprising: an outer vessel having a first cavity and an outer vessel opening; an inner vessel having a wall defining a second cavity and an inner vessel opening, the infusion vessel configured to be received through the outer vessel opening; a pad having a wall defining a pocket to receive a bottom end of the inner vessel, and at least one deformable shock-absorbing member disposed beneath the inner vessel when the bottom end is received in the pocket; a lid assembly comprising an accessory retainer and adapted to be removably attachable to the outer vessel to seal the outer vessel opening and the inner vessel opening; an accessory comprising a retention element configured to engage the accessory retainer to removably attach the accessory to the lid assembly so that the accessory is received through the outer vessel opening when the lid assembly is attached outer vessel.

According to another aspect of the present invention there is provided a container kit, comprising: an outer vessel having a first cavity, the first cavity having an opening; an inner vessel having a second cavity, the second cavity having an opening, the inner vessel configured to be receivable in the first cavity such that the opening of the second cavity is positioned proximate the opening of the first cavity; a lid assembly adapted to be removably attachable to the outer vessel; an accessory; a releasable attachment mechanism operable to removably attach the accessory to the lid assembly such that the accessory is received in the first cavity when the lid assembly is attached to the outer vessel; at least one variant component interchangeable with one of the inner vessel, the lid assembly and the accessory.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention:

FIG. 3A is a perspective view of another part of the container of FIG. 1A;

FIG. 3B is a front view of the part of FIG. 3A;

FIG. 3C is a elevation cross sectional view at section 3C-3C in FIG. 3B;

FIG. 3D is a top plan view of the part of FIG. 3A;

FIG. 3E is a bottom plan view of the part of FIG. 3A;

FIG. 5A is a perspective view of a part of the container of FIG. 1A;

FIG. 5B is a front view of the part of FIG. 5A;

FIG. 5C is a elevation cross sectional view at section 5C-5C in FIG. 5B;

FIG. 5D is a top plan view of the part of FIG. 5A;

FIG. 5E is a bottom plan view of the part of FIG. 5A;

FIG. 10A is a front elevation view of the container of FIG. 1A configured in a first mode of operation;

FIG. 10B is a elevation cross sectional view at section 10B-10B in FIG. 10A;

FIG. 11A is a front elevation view of the container of FIG. 1A configured in a second mode of operation;

FIG. 11B is a elevation cross sectional view at section 11B-11B in FIG. 11A;

FIG. 12A is a front elevation view of the container of FIG. 1A configured in a third mode of operation;

FIG. 12B is a elevation cross sectional view at section 12B-12B in FIG. 12A;

FIG. 15A is a perspective view of a container;

FIG. 15B is an exploded view of the container of FIG. 15A;

FIG. 15C is a side elevation view of the container of FIG. 15A;

FIG. 17A is a perspective view of another container;

FIG. 17B is an exploded view of the container of FIG. 17A;

FIG. 17C is a side elevation view of the container of FIG. 17A; and

DETAILED DESCRIPTION

Figure 1A:
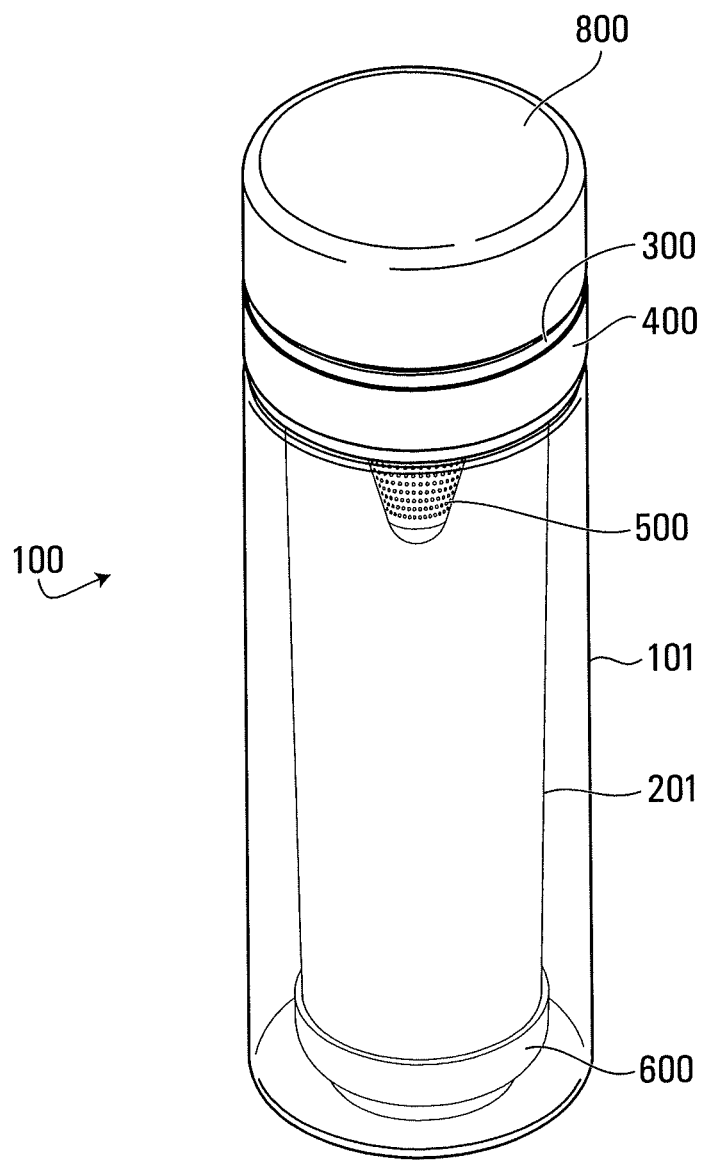
FIG. 1A is a perspective view of an assembled container.
Figure 1B:
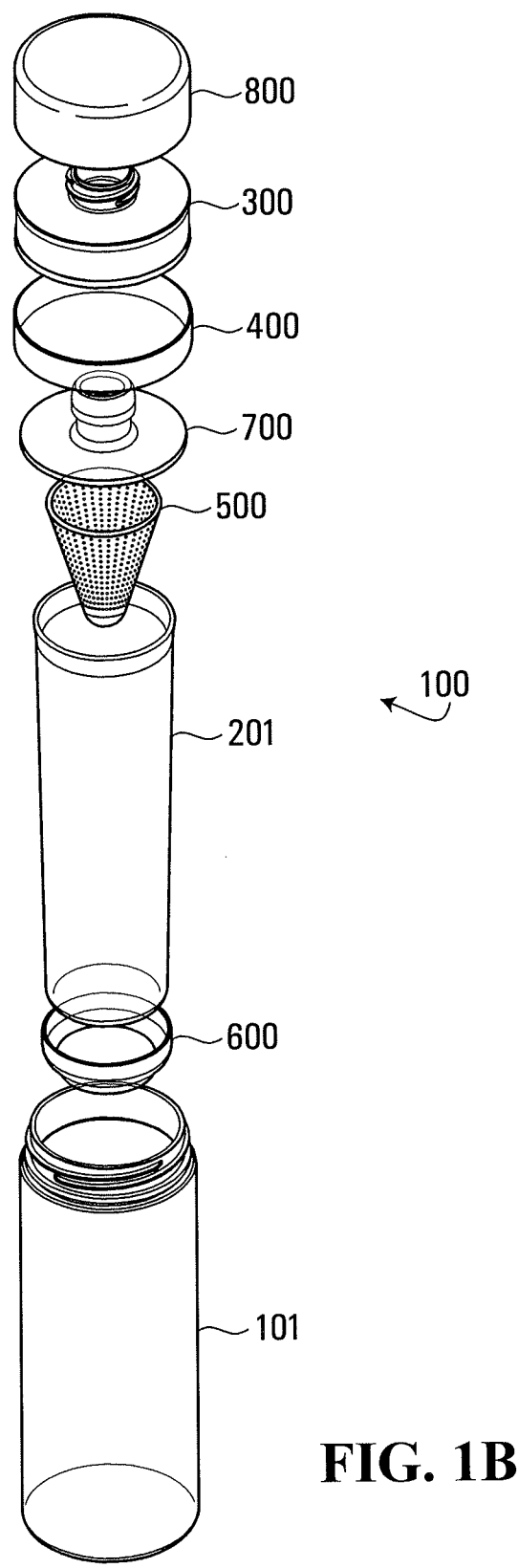
FIG. 1B is an exploded perspective view of the container of FIG. 1A.

With reference first to FIG. 1A, a container 100 is shown in an assembled configuration. In FIG. 1B the components that may comprise container 100 are shown in a disassembled configuration with the components exploded apart. Container 100 may comprise an outer vessel 101, an inner vessel 201, a lid 300, a lid grip band 400, a tea strainer 500, a base pad 600, a seal spout 700 and a cap 800.

As disclosed, container 100 has several significant features including: (a) an outer container that may provide some level of protection from impact forces to the inner container; (b) the possibility to select materials for the inner and outer vessels based on different or at least not completely overlapping design parameters. For example, while the materials for both inner and outer vessels may be chosen so that they are safe for storing and use of liquids for human and/or animal consumption, the outer vessel 101 may be selected so that it is a more impact resistant material than the inner vessel 201.

Inner vessel 201 may be chosen as suitable and safe for storing liquids at temperatures that are significantly above or below typical environment temperatures (e.g. for storing hot or cold beverages), whereas outer vessel 101 may be selected to be only suitable and safe for storing liquids at temperatures that are around normal environment temperatures (for example in the range of 1-20 degrees Celsius), or just for storing liquids that are at or below normal environment temperatures.

With reference to FIGS. 2A-2D, outer vessel 101 will provide a relatively strong, break-resistant protective shell for container 100. Outer vessel 101 can be made from a wide variety of materials suitable to fulfil the functions as described herein.

Suitable outer vessel materials may be selected based on one or more, or a combination of other additional physical and chemical properties including, for example, odour resistance, heat and chemical resistance including hydrolytic stability, transparency/translucency and visual clarity, touch feel (flexibility), weight, durability, costs, availability and ease of processing and handling. Other factors may include potential hazard or toxicity to the users or the environment both during use and when disposed.

Suitable outer vessel materials may include polymers including copolymers, such as polyolefins and polyesters. For example, the outer vessel may contain one or more of copolyesters, polyethylenes including high-density polyethylene (HDPE) and low-density polyethylene (LDPE) or polyethylene terephthalates (PET), polypropylenes (PP), polycarbonates (PC), polyacrylates such as poly(methyl methacrylate)s (PMMA), polystyrenes (PS), polyvinyl chloride (PVC), Polybutylene Terephthalate (PBT), and derivatives or combination thereof.

A suitable copolyester material may contain terephthalic acid (TA), naphthalenedicarboxylic acid and ethylene glycol, and a catalyst metal, as described in U.S. Pat. No. 5,851,612 the entire contents of which is hereby incorporated herein by reference. Co-polyesters may be formed from monomers such as dimethyl terephthalate (DMT), tetramethyl cyclobutanediol, and cyclohexanedimethanol. For example see the teachings of U.S. Pat. No. 6,284,866 the entire contents of which is hereby incorporated herein by reference.

Particularly useful co-polyesters are those disclosed in U.S. Pat. No. 7,026,027 the entire contents of which is hereby incorporated herein by reference. Co-polyesters disclosed in this patent may be sold under the trade mark TRITAN™ by Eastman. Accordingly, a suitable copolyester may be an amorphous copolyester having an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3. The copolyester includes a diacid component comprising about 90 to 100 mole percent terephthalic acid residues and 0 to about 10 mole percent isophthalic acid residues and a diol component comprising about 10 to about 70 mole percent 1,4-cyclohexanedimethanol residues and about 90 to about 30 mole percent neopentyl glycol residues. The amorphous copolyesters comprises 100 mole percent diacid component and 100 mole percent diol component. The diacid component may consist essentially of about 90 to 100 mole percent terephthalic acid residues and 0 to about 10 mole percent isophthalic acid residues. The diol component may consist essentially of about 10 to about 70 mole percent 1,4-cyclohexanedimethanol residues and about 90 to about 30 mole percent neopentyl glycol residues. In some embodiments, the diacid component may consist essentially of at least 95 mole percent terephthalic acid residues, such as 100 mole percent terephthalic acid residues. The diol component may consist essentially of about 30 to about 70 mole percent 1,4-cyclohexanedimethanol residues and about 70 to about 30 mole percent neopentyl glycol residues, such as about 35 to about 60 mole percent 1,4-cyclohexanedimethanol residues and about 40 to about 65 mole percent neopentyl glycol residues. The amorphous copolyester may have an inherent viscosity (IV) of about 0.6 to about 1.1 dL/g and may include a diacid component consisting essentially of terephthalic acid residues; and a diol component consisting essentially of about 35 to about 60 mole percent 1,4-cyclohexanedimethanol residues and about 40 to about 65 mole percent neopentyl glycol residues.

Outer vessel 101 may also be made from plastics including made of the polymer materials discussed above.

In some embodiments, it is necessary that the outer vessel 101 be safe to hold a liquid from a human/animal health perspective. For example, outer vessel 101 may be made of one or more various relatively strong and rigid plastics, metals (such as for example aluminium, stainless steel and other metal alloys), composite plastic materials and other composites such as acrylic or any other break-resistant material that is suitable to hold a beverage.

However, a most particularly advantageous material that has been identified is Eastman's TRITAN™ —as referenced above which is a clear copolyester that has specific advantageous features such being safe for storage and use, and which is also resistant to degradation by various chemicals such as for example detergents, acidic drink chemicals. TRITAN is considered a safe material for storing most if not all beverages that are to be consumed by people. Being a transparent material, TRITAN has advantages when used in container 100 such as for example, it is readily visible whether an inner vessel 201 and tea strainer 500 are located within the outer vessel 101. Additionally, if inner vessel 201 is also made from a transparent material such as a clear glass, any liquid held in the inner vessel 201 is visible from outside the container. TRITAN material is relatively very strong compared to other similar materials, but provides a slight degree of flexibility that assists in absorbing impact forces and thus providing some level of protection of the inner vessel.

Figure 2D:
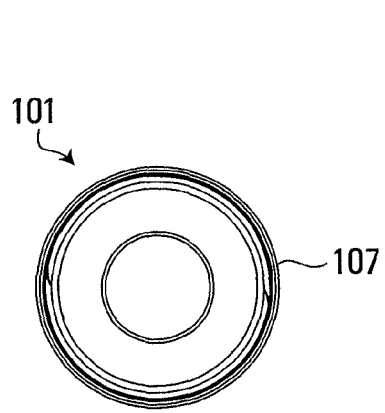
FIG. 2D is a top plan view of the part of FIG. 2A.
Figure 2A:
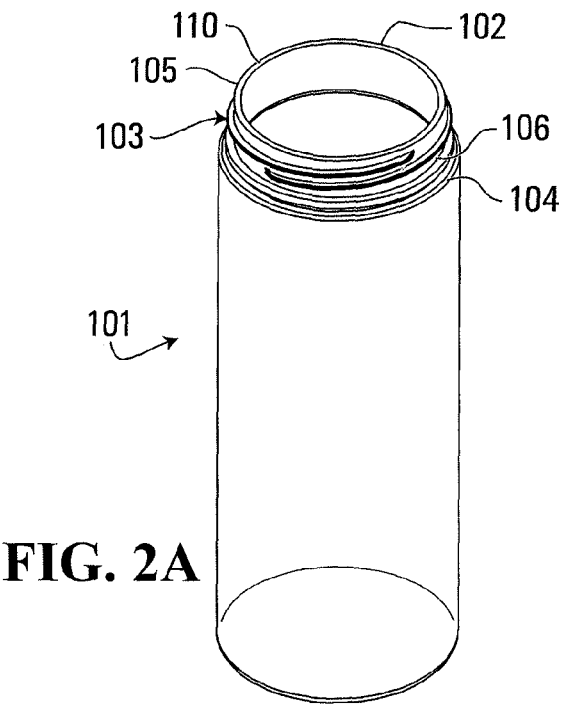
FIG. 2A is a perspective view of a part of the container of FIG. 1A.
Figure 2B:
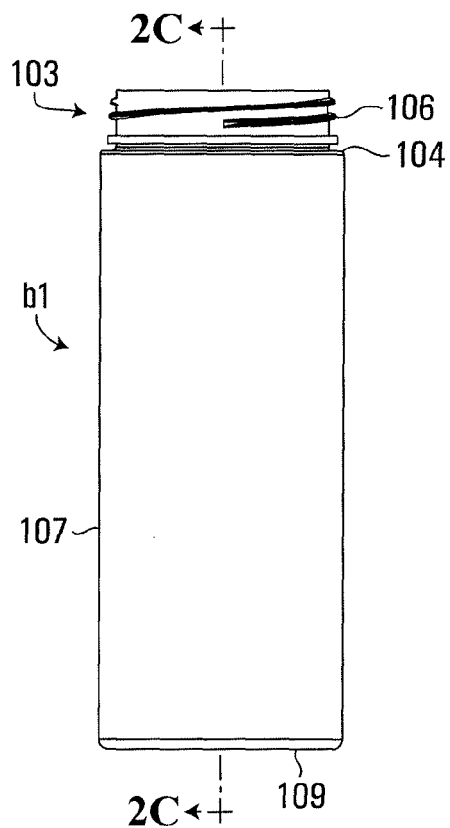
FIG. 2B is a front view of the part of FIG. 2A.
Figure 2C:
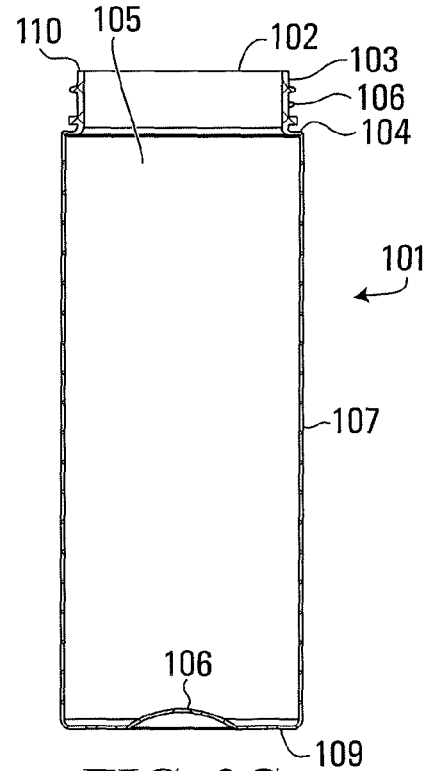
FIG. 2C is a elevation cross sectional view at section 2C-2C in FIG. 2B.
Figure 4A:
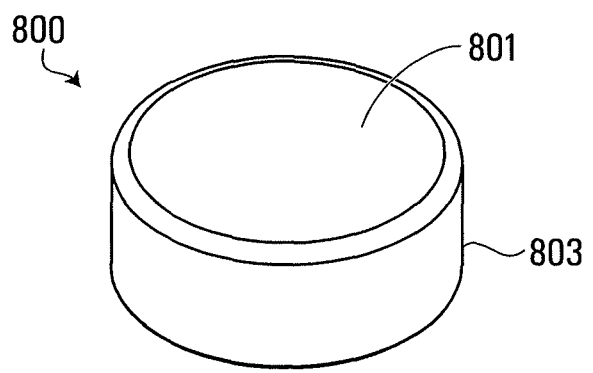
FIG. 4A is a perspective view of a part of the container of FIG. 1A.
Figure 4B:
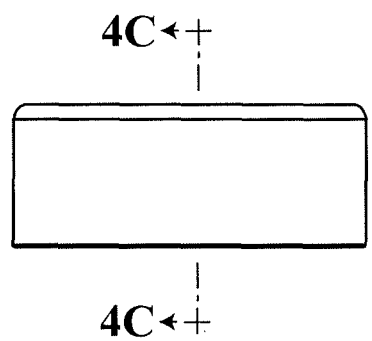
FIG. 4B is a front view of the part of FIG. 4A.
Figure 4C:
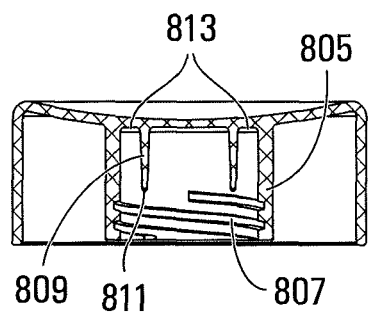
FIG. 4C is a elevation cross sectional view at section 4C-4C in FIG. 4B.
Figure 4D:
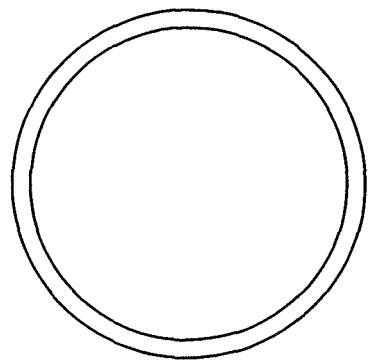
FIG. 4D is a top plan view of the part of FIG. 4A.
Figure 4E:
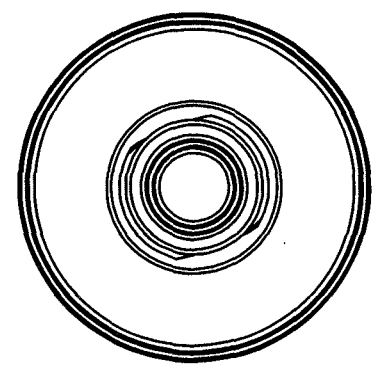
FIG. 4E is a bottom plan view of the part of FIG. 4A.

As can be seen in detail in FIGS. 2A-2D, the outer vessel 101 may have a shape of a generally tubular cylinder, and in particular may be a generally right cylinder, with an inner cavity 105 defined by the inner surface of the curved circular side wall 107. The outer vessel 101 may also have a closed bottom wall 109 and a top opening 102. As can be seen in FIG. 2C, bottom wall 109 may have a central upward dome portion 106. Dome portion 106 can be configured to mate with a dome-shaped indentation 606 in a bottom surface of base pad 600 of inner vessel 201 (see FIG. 3C). Thus, the co-operating dome portions of the inner vessel 201 and base pad 606, can, when inner vessel 201 is connected to base pad 600, form a lower stabilization device to help to locate inner vessel 201 in a relatively central location with its outer surface separated from the inner side wall surface of outer vessel 101.

The top edge of 104 of side wall 107 of outer vessel 101 leads to an integrally formed and slightly narrowed neck portion 103 which carries outwardly oriented threads 106. Neck portion 103 terminates at an upper edge 110. Thus, the top neck portion 103 of the generally cylindrical outer vessel 101, proximate opening 102, can be configured to be releasably attachable to the lid 300, for example using spiral thread interconnection between threads on an inside surface of the lid 300 and threads 106 on the neck portion 103.

With reference to FIGS. 6A-6E, inner vessel 201 may be shaped as a slightly conical, generally cylinder tube with an inner cavity 205. Inner vessel 201 may have a slightly tapered side wall 207 which provides slightly tapered inner and outside side surfaces. In other embodiments, generally side wall 207 may not be tapered either on the inner or outer surfaces. Inner vessel 201 may also have a closed bottom wall 209, from which side wall 207 may extend to a generally circular upper opening 202. The upper-most portion 203 of side wall 207 leading to opening 202 may be further flared or tapered outwards as will be evident for example in FIG. 6c. Inner vessel 201 may be sized and shaped to be able to be received into the inner cavity 105 of outer vessel 101. Preferably a space separate the outer surface of inner vessel 201 from the inner surface of outer vessel 101, except in the region where lid 300 engages the top of inner vessel 201 and connects to the outer threads 106 on neck portion 103 of outer vessel 101 (see for example FIG. 10B).

Inner vessel 201 may be made of a material that is generally not as resistant to breakage as the outer vessel 101 when subjected to impact forces as the material from which the outer vessel is made, yet be specifically selected to be inert and be especially useful in holding liquids for human consumption, particularly hot or cold liquids. Inner vessel 201 may be made of glasses such as borcilite glass/borsilicate glass, ceramics such as pottery including earthenware, stoneware and porcelain; and coloured glass. Suitable ceramics may include oxides, nonoxides and composite materials.

In some other embodiments, inner vessel 201 may be made from plastics (polymers) as discussed above in relation to the choice of materials for outer vessel 201. However, the material from which inner vessel 201 is made may be chosen for other characteristics, such as odour resistance, heat and chemical resistance including hydrolytic stability. In some embodiments, the chemical and bio-compatibility may be given more consideration, and the impact resistance may be given less consideration in some embodiments, as compared to the selection of the outer vessel material.

The choice of material for inner vessel 201 may provide for a vessel that is food safe and taste and/or odour inert.

With concerns being raised about the use of at least some plastics in storing beverages for human consumption, particularly hot beverages, or when containers are subjected to relatively cold temperatures, the use of these types of these other materials including glass alleviates some of those concerns.

The outer dimension and shape of inner vessel 201 may be selected so that all or substantially all of inner vessel 201 can be received through top opening 102 of outer vessel 101 and thus be located entirely or substantially entirely within, inner cavity 105. In some embodiments, a portion of the outer cylindrical wall 207 near opening 202 of the inner vessel 201 may be of such dimensions and shape that it does not fit through the opening of the outer vessel 101. As indicated above, the upper-most portion 203 of side wall 207 leading to opening 202 may be further flared or tapered outwards so it may engage the top edge 105 of neck portion 103 of the outer vessel 101 (see for example in FIG. 10B or 11B). The engagement of the outward facing surface 203 near top edge 204 of inner vessel 201 with the top edge 110 of outer vessel 101 and thus the top edge 204 of inner vessel 201 may substantially rest on top of the top edge 110 of outer vessel 101. This co-operation of inner vessel and outer vessel may provide for lateral stabilization and securement of inner vessel 201 relative to outer vessel 101.

With reference to FIGS. 3A-3E, a base pad 600 may be provided and may be formed from a material that provides sufficient support for inner vessel 201 and some level of shock absorption. Base pad 600 may be made from any energy or shock-absorbing material which when compressed between outer vessel 101 and inner vessel 201 it is readily and reversibly deformed to absorb impact force but still stabilizes inner vessel 201 relative to outer vessel 101. In some embodiments, base pad 600 may be made of an elastomeric material. An elastomer can, after being deformed, return to approximately original shape and dimensions in a relatively short time Example elastomeric materials include suitable thermoplastic polymers, thermoplastic rubbers (TPR), thermoset rubbers, or co-polymers or mixtures thereof. In some embodiments, suitable thermoplastic polymers may be selected from elastomer (TPE) styrenics, polyolefins (TPO), low density polyethylenes (LDPE), high-density polyethylenes (HDPE), linear low-density polyethylenes (LLDPE), ultra low-density polyethylenes (ULDPE), polyurethanes (TPU) polyethers, polyesters, etheresterelastomers (TEEEs) copolyesters, polyamides (PEBA), melt processible rubbers (MPR), vulcanizates (TPV), and mixtures or co-polymers thereof. In some embodiments, suitable elastomers and rubbers may also be selected from butadiene rubbers (BR), butyl rubbers (IIR or PIB), chlorosulfonated polyethylenes (CSM), epichlorohydrin rubbers (ECH or ECO); ethylene propylene diene monomer (EPDM), ethylene propylene rubber (EPR), fluoroelastomers (FKM), nitrile rubbers or nitrile butadiene rubbers (NBR), perfluoroelastomers (FFKM), polyacrylate rubbers, (ASM), polycholorprene (CR), polyisoprene (IR), polysulfide rubbers (PSR), polysiloxanes or silicone rubbers (SiR), styrene butadiene rubbers (SBR), and mixtures or co-polymers thereof. To modify the properties of the elastomer or for processing purposes, additives such as vulcanizing materials, antioxidants, plasticizers, fillers, and colorants may be added. In one embodiment the base pad 600 may be made from a silicone rubber. It is also possible to use other resilient materials that can support and stabilize inner vessel while providing energy impact absorption.

Pad 600 may be configured with an upward facing pocket 601 which can be received onto the bottom of inner vessel 201. As the base pad material may be somewhat elastic, if it is sized appropriately, base pad pocket 601 may be resiliently displaced when fitted onto the bottom of inner vessel 201 thus being secured thereon. Base pad 600 can provide support and shock absorption when installed onto the bottom surface of inner vessel 201 between the lower surface of inner vessel's bottom wall 209 and the upper surface of the bottom wall 109 of outer vessel 101. Thus when an impact force is transmitted to the outer vessel 101, any shock that might be transmitted from the bottom wall 109 of outer vessel 101 to the bottom wall 209 of the inner vessel 201 can be significantly reduced. As will be explained hereinafter, the force absorption effect for inner vessel 201 is enhanced by also providing cushioning at the top end of the inner vessel 201 and/or outer vessel 101. In the embodiment illustrated, the enhanced absorption may be provided by use of a spout seal 700 that is located within lid 300. Spout seal 700 may be made from any food-safe material which, when compressed between lid 300 and the top edge of outer vessel 101 or inner vessel 201, is readily and reversibly deformed to provide a fluid-tight seal between such components. The material used for seal spout 700 may have similar properties as, and selected from, the materials discussed above as being suitable for the base pad 600. A material is food-safe if it complies with food safety requirements imposed for example by governmental, trade, and corporate agencies, or if it meets a generally accepted food industry standard. In selected embodiments, seal spout 700 may be made from a silicone rubber.

Container 100 may also include lid 300 (with seal spout 700 installed) and a cap 800. These components can co-operate to releasably contain liquid within the inner cavity 205 of inner vessel 201 (when the inner vessel is located inside the outer vessel) or within cavity 105 of outer vessel 101 if the container 100 is being configured with no inner vessel 201.

Lid 300 may be comprised of a generally cylindrical body portion 310 and an integrally connected cylindrical spout 330. Thus lid body 310 may have a disc plate portion 303 from which extends a generally arcuate, circumferentially extending side wall 305 defining an inner cavity portion 309 that leads to an opening in disc 303 an into an inner passage through spout 330.

Lid 300 can be made of plastics (particularly engineered plastics), metals, or a composite material so long as it is compatible for providing a threaded engagement to threads 106 of outer vessel 101. By way of example only, lid 300 could be made from a relatively hard plastic such as polypropylene, acrylonitrile butadiene styrene (ABS), high-density polyethylene (HDPE) and other similar plastics. Within the inner cavity 309 of lid body 310, on the inner surface of side wall 305, can be provided internal threading 319 that are configured to co-operate with the external threading 106 of outer vessel 101. Thus lid 300 may be adapted to reversibly attach to the outer vessel 101, using for example spiral threading.

To assist with providing a seal between either the cavity 105 of inner vessel 201 and/or the cavity 205 of outer vessel 101, seal spout 700 can be provided and if made from an elastic material can be press fit into engagement with lid 300. Seal spout 700 may be formed with a sealing disc 701 having an upper surface 701a and lower surface 701b. Surface 701a can be positioned within cavity 309 or lid 300 in positive engagement with a downward facing surface of lid body portion 310 of lid 300. Spout neck 703 of spout seal 700 can be received within and through lid spout 330 of lid 300. Spout portion 709 may protrude above lid spout 330. In some embodiments, the part of the seal spout 700 that extends beyond the spout 330 of lid 300 has an outer diameter greater than the inner diameter of the spout 330, and thereby inhibits the inner seal spout 700 from sliding out of the lid 300. This arrangement may assist in attaching the sealing spout 700 to the lid 310.

An aperture 704 extending through sealing disc 701, spout neck 703 and spout portion 709, thus provides a communication channel for liquid through lid 300 such that liquid moving from either cavity 105 in inner vessel 201 or cavity 205 in outer vessel 101 never contacts any surface of lid 300 when passing through lid 300 when a person is accessing the liquid held in container 100.

Therefore, co-operating together, lid 300 and spout seal 700 can be configured to form a liquid-tight seal with the outer vessel in the absence of the inner vessel. If the inner vessel is not inside outer vessel, the lid 300 will, when the lid is closed, have the lower sealing disc 701B portion of the sealing member 700 compressed between the body of the lid 310 and the upper edge 110 of the outer vessel 101, to form a liquid-tight seal between the sealing member 700 and the outer vessel (see FIG. 12B).

With particular reference to FIGS. 4A-4E, cap 800 may be comprised of a top portion 801 from which extends a generally arcuate, circumferentially extending side wall 803 forming a cylindrical body and defining a cavity. The top portion 801 may be concave, extending into the cavity formed by the top portion 801 and the side wall 803. From the top portion 801 extends a second generally arcuate, inner side wall 805 forming a cylindrical inner cavity. The inner surface of the inner side wall 805 may be adapted with spiral threading to reversibly engage with the threading on the outer surface of the spout 330.

From the top portion 801 extends a third generally arcuate, inner side wall 809 forming a cylindrical inner cavity. The cylindrical cavity formed by side wall 809 may be concentric with but smaller in diameter than the cylindrical cavity formed by side wall 805. Side wall 809 may be shorter than side walls 803 and 805. As it extends away from the top portion 801, side wall 809 may gradually decrease in cross-sectional width and taper to a narrow end 811. The distance between side wall 805 and side wall 809 defines a ring-shaped region 813 on the inner surface of the top portion 801 (see FIG. 4C).

When the cap 800 is closed over spout 330, the narrow end 811 of inner side wall 809 comes into contact with the inner surface 711 of the spout portion 709. This contact contributes to forming a liquid-tight seal between the cap 800 and the spout 330. In addition, when the cap 800 is closed over spout 330, the top portion 713 of the spout portion 709 comes into contact with the ring-shaped region 813. This contact also contributes to forming a liquid-tight seal between the cap 800 and the spout 330 (see FIG. 12B).

Cap 800 can be made of plastics (particularly engineered plastics), metals, or a composite material so long as it is compatible for providing a threaded engagement to threads on the outer surface of the spout 330. By way of example only, cap 800 could be made from a relatively hard plastic such as polypropylene, acrylonitrile butadiene styrene (ABS), high-density polyethylene (HDPE) and other similar plastics.

Thus spout 330 may be enclosed by cap 800, which can reversibly form a liquid-tight seal with the spout 330 of the lid 300. Cap 800 can be made from a material that is the same or different to lid 300. In one embodiment, both lid 300 and cap 800 may be made from polypropylene.

In a mode of operation, the lid 300 with sealing spout 700 in place can be configured to releasably secure the inner vessel 201 within the outer vessel 101 and to form a liquid-tight seal between the sealing spout 700 and the top edge 204 of the cylindrical wall of inner vessel 201. As shown in FIGS. 10B and 11B, the opening 202 of the inner vessel 201 may be of such a shape and dimension that it will not fit through the mouth of the outer vessel 102. In this embodiment, when the inner vessel 201 is placed inside the outer vessel 101 and the lid 300 is secured on the top of outer vessel 101, the sealing member 700 is compressed between the body of the lid 300 and the top edge 204 of the outer wall at opening 202 of the inner vessel 201. This can apply compression to, and thereby secure, the inner vessel 201 in place as it is held between the seal spout 700 and base pad 600. Also, this configuration can form a liquid-tight seal between the sealing spout 700 and the edge 204 near the top opening of the inner vessel 201 such that liquid held within inner cavity 205 can not pass except through the top opening in the seal spout 700. Also, the engagement of the outward facing surface 203 proximate top edge 204 of inner vessel 201 with the top edge 110 of outer vessel 101 may provide for lateral stabilization and securement of inner vessel 201 relative to outer vessel 101. The result is that the inner vessel 201 can be held between upper and lower impact absorption devices (i.e. base pad 600 and the combination of seal spout 700 and lid 300) with both the bottom and top of inner vessel 201 being also supported against lateral movement relative to the inner surface of side wall 107 of outer vessel 101. Additionally, a substantial air seal may be provided between the top of the inner vessel and the top of the outer vessel to thereby trap the air located in the space between the outside surface of side wall 207 of inner vessel 201 and the inside surface of side wall 107 of outer vessel 101. This area of substantially sealed air can act to provide insulation either to slow down the cooling of a hot liquid held in inner cavity 205 of inner vessel 201 or to slow down the increase in temperature of a cold liquid, relative to the outside environment's temperature. In effect, the double wall structure can in this embodiment and in other embodiments described herein, as an insulation layer.

In a variation (not shown), the inner vessel 201 and base pad may be taller than the outer vessel 101 is deep. Therefore, when resting inside the outer vessel 101, the inner vessel 201 extends through and beyond the mouth of the outer vessel. When the inner vessel is placed inside the outer vessel and the lid is closed, the sealing disc 701 is compressed between the body of the lid 310 and the mouth of the inner vessel 201, secures the inner vessel in place, and forms a liquid-tight seal with the inner vessel. However, to increase the stability of the inner vessel relative to the outer vessel, the cap 800 may need to provide within its cavity a configuration which provides some lateral support for the top of the inner vessel. In some embodiments, the combined height inner vessel 201 and base pad 600 may be such that, without a lid closed onto the container, inner vessel 201 sits about 2-3 mm above the rim of outer vessel 101.

In another variation (also not shown), the inner vessel and base pad may be as tall as the outer vessel is deep. Therefore, when resting inside the outer vessel, the inner vessel extends just to the mouth of the outer vessel. When the inner vessel is placed inside the outer vessel and the lid is closed, the sealing disc 701 is compressed between the body of the lid 310 and both the mouth of the inner vessel 201 and the mouth of the outer vessel 102, securing the inner vessel in place, and forming a liquid-tight seal with both the inner vessel and the outer vessel.

In another variation (also not shown), the container 100 may be assembled without the base pad 600. In this embodiment the engagement of the outward facing surface 203 proximate top edge 204 of inner vessel 201 with the top edge 110 of outer vessel 101 can prevent the inner vessel from falling into the outer vessel 201. This engagement suspends the inner vessel within the outer vessel so that the inner vessel does not come into contact with the outer vessel other than at the points of aforementioned engagement. When the inner vessel 201 is placed inside the outer vessel 101 and the lid 300 is secured on the top of outer vessel 101, the sealing member 700 is compressed between the body of the lid 300 and the top edge 204 of the outer wall at opening 202 of the inner vessel 201. This can secure the inner vessel 201 in place as it is held between the seal spout 700 and the top edge 110 of the outer vessel 101. Also, this configuration can form a liquid-tight seal between the sealing spout 700 and the edge 204 near the top opening of the inner vessel 201 such that liquid held within inner cavity 205 can not pass except through the top opening in the seal spout 700.

Figure 8A:
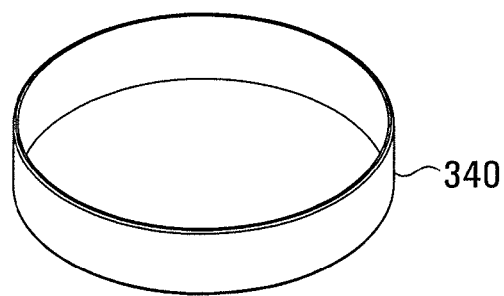
FIG. 8A is a perspective view of a part of the container of FIG. 1A.
Figure 8B:
FIG. 8B is a front view of the part of FIG. 8A.
Figure 8C:
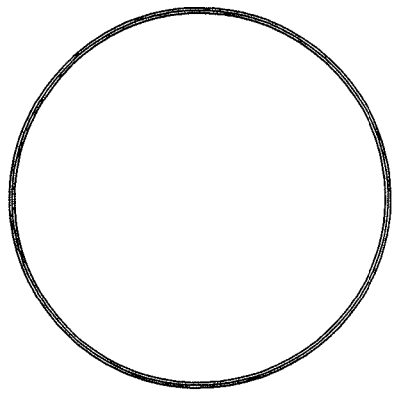
FIG. 8C is a top plan view of the part of FIG. 5A.
Figure 9A:
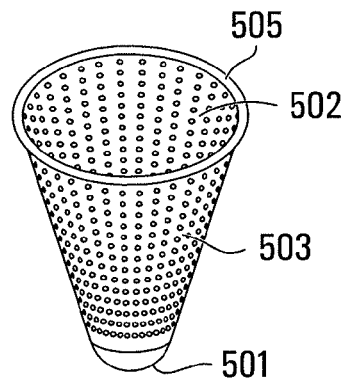
FIG. 9A is a perspective view of a part of the container of FIG. 1A.
Figure 9B:
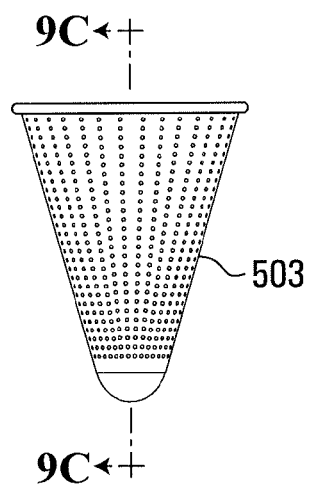
FIG. 9B is a front view of the part of FIG. 9A.
Figure 9C:
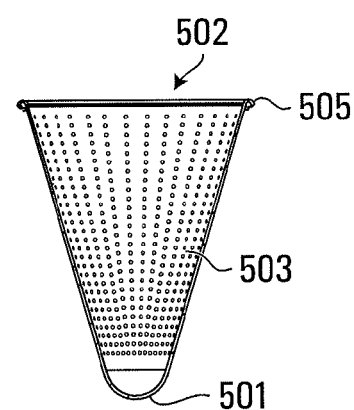
FIG. 9C is a elevation cross sectional view at section 9C-9C in FIG. 9B.
Figure 9D:
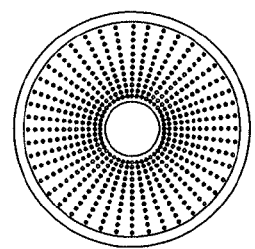
FIG. 9D is a top plan view of the part of FIG. 9A.
Figure 9E:
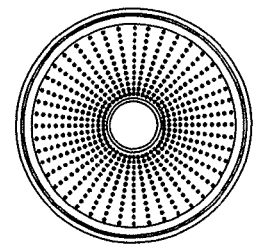
FIG. 9E is a bottom plan view of the part of FIG. 9A.

The lid 300 may also have a grip band 340 that may be positioned around it. The grip band may be a separate component (see FIGS. 8A-8C) or be integrally formed as part of lid 300. Grip band 340 may be a band that provides a relatively high friction outer surface that runs along the circumferential area of side wall 305 of the lid 300. The increased friction can be added using any method known in the art including creating a band of rough, threaded, or textured finish running along the circumference of the lid, or by adding a band of a second tacky material such as rubber.

The cap 800 can reversibly attach to the lid through any means known in the art, including spiral threading on the outer surface of the spout 330 of lid 300. The liquid-tight seal with the spout 330 is formed using any of the methods known in the art. In one example where the spout portion 709 extends through and beyond the spout 330, the spout portion is compressed between the cap 800 and the spout 330 of lid 300 and forms a liquid-tight seal between the cap and the spout.

The invention may include a strainer 500, which can be used, for example, to keep steeping tea leaves separate from the contents of the inner vessel 201 and the outer vessel 101. The strainer 500 can be of any general shape configuration that is suitable to fulfil the functions identified herein. Strainer 500 can also be made of any material known in art to be suitable for coming into contact with hot beverages, including metals, plastics, composite materials, or cloth. The strainer may be free floating, attached to a retrieval device such as a handle, wire, or thread, or attached using any method known in the art to a part of the beverage container such as the outer vessel 101, the inner vessel 201, the lid 300, the body of the lid 310, or the seal spout 700.

In one embodiment, a generally conically shaped strainer 500 is comprised of a closed bottom portion 501, a perforated body portion 503 and an upper rim 505 surrounding an opening 502. The opening 502 may be reinforced by rim 505 that may be a piece of steel wire or the like and which can be formed integrally with the body of the tea strainer or as a separate piece. The spout seal 700 that may be held in lid 300 may be adapted to include a strainer attachment annular ring 705, such that the rim 503 can releasably inserted into the strainer attachment ring 705. In addition to holding the strainer in place, the spout seal 700 may also encloses the opening 502 of the strainer 502 and prevents the contents of the strainer from entering the outer vessel 101 or the inner vessel 201.

In use container 100 may be used in at least in any one of three modes of operation illustrated in FIGS. 10A, 10B, 11A, 11B and 12A, 12C.

In a first mode of operation illustrated in FIGS. 10A and 10B, container 100 is shown with all components being used including inner vessel 201 being held securely within outer vessel 101, and with the strainer 500 being held by seal spout 700. When used in this a mode, a person can have placed tea leaves in the strainer, then attach the strainer to the seal spout and lid combination. With cap 800 removed, hot water can be poured through spout components 330/709/703 passing though lid 300 into inner vessel 201. Then cap 800 can be secured to lid 300 to hold the hot tea beverage within inner cavity 205 of inner vessel 201.

In a second mode of operation illustrated in FIGS. 11A and 11B, container 100 is shown with all components being used including inner vessel 201 being held securely within outer vessel 101, except the strainer 500. When used in this a mode, a person can fill inner vessel with a hot or cold beverage. This can be done either with the inner vessel 201 already inserted into outer vessel 101 or with the inner vessel removed during filling. Regardless, inner vessel 201 can be inserted into the outer vessel and hold the hot beverage in cavity 205. Cap 800 can be secured to lid 300 to hold the hot tea beverage within inner cavity 205 of inner vessel 201.

In a third mode of operation illustrated in FIGS. 12A and 12B, container 100 is shown with all components being used except inner vessel 201 and strainer 500. When used in this a mode, a person can fill the outer vessel 101 with a beverage preferably a beverage that is just warm, or at "room" or near to external environment temperature or also a "cold beverage". Cap 800 can be secured to lid 300 will hold the beverage within inner cavity 105 of outer vessel 101.

Each of components container 100 including outer vessel 101, inner vessel 201, lid 300, lid grip band 400, base pad 600, seal spout 700 and cap 800 can be formed using various types of know manufacturing processes. For example at least some or all of plastic parts could be formed using injection moulding technology known to those skilled in the art. The outer vessel 201 when made from TRITAN can be best made using blow moulding techniques known to those skilled in the art.

Tea strainer 500 if made from a metal could be specially fabricated using known metal working techniques such as die cut metal working and spot welding.

In some embodiments, the components of container 100 may be part of a set of components 1000 which can be used to form one or more of a plurality of possible containers. Set 1000 includes the components of container 100, which may be assembled as described above to form container 100.

In addition, set 1000 includes additional components which may be interchangeably substituted for components of container 100 to form variant containers. For convenience, variant components or assemblies which may be substituted for components or assemblies of container 100 are identified with like reference numbers and with suffixes "a", "b", "c", etc.

For example, set 1000 may include one or both of outer vessels 101a, 101b which may be substituted for outer vessel 101. Outer vessel 101a may have the shape of a generally tubular cylinder, with a cavity 105a therein. Outer vessel 101a has a neck portion 103a which defines an opening to cavity 105a and has threads identical to threads 106 of outer vessel 101. Vessel 101a may also have a dome portion in its bottom wall, identical to dome portion 106 of outer vessel 101 (see FIGS. 2A-2D). Outer vessel 101a may be the same height as outer vessel 101, but have a larger diameter, and thus, larger volume.

Outer vessel 101b may have the shape of a generally tubular cylinder, with a cavity 105b therein. Outer vessel 101 has a neck portion 103b defining an opening to cavity 105b and substantially identical to neck portions 103, 103a. Outer vessel 101b may be substantially identical to outer vessel 101, except that outer vessel 101b has a raised portion 108 integrally formed in its bottom wall. Raised portion 108 is raised relative to the remainder of the bottom wall. As will be apparent, when inner vessel 201 and pad 600 are inserted in inner vessel 101b, the total height of raised portion 108, pad 600 and inner vessel 201 may be slightly greater than that of dome portion 106 of outer vessel 101, pad 600 and inner vessel 201. However, the dimensions of pad 600, dome portion 106 and raised portion 108 may be selected so that, in either case, the top edge of inner vessel 201 extends about 2-3 mm above that of outer vessel 101/101b when no lid is present.

Outer vessels 101a, 101b may be formed from the same material as outer vessel 101, or from any of the materials identified above as being suitable for outer vessel 101.

Figure 6A:
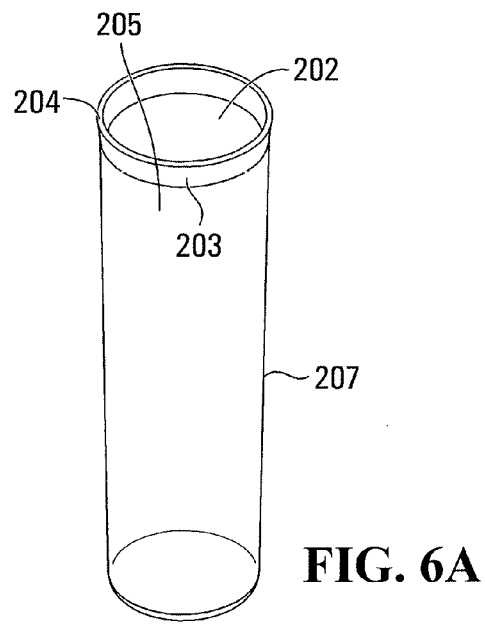
FIG. 6A is a perspective view of a part of the container of FIG. 1A.
Figure 6D:
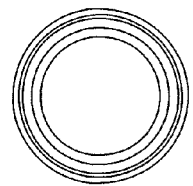
FIG. 6D is a top plan view of the part of FIG. 6A.
Figure 6E:
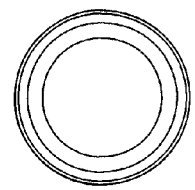
FIG. 6E is a bottom plan view of the part of FIG. 6A.
Figure 6B:
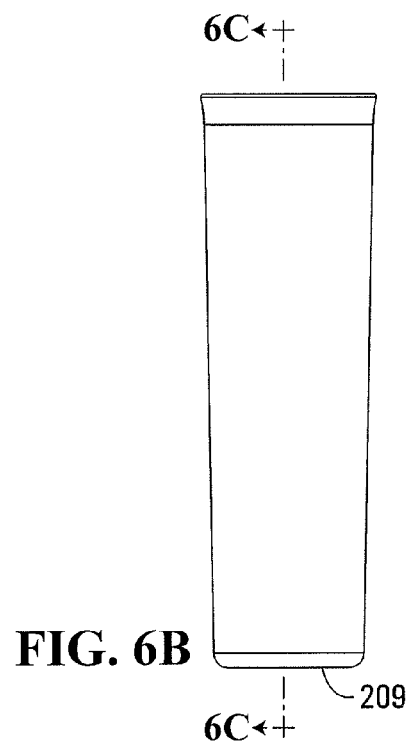
FIG. 6B is a front view of the part of FIG. 6A.
Figure 6C:
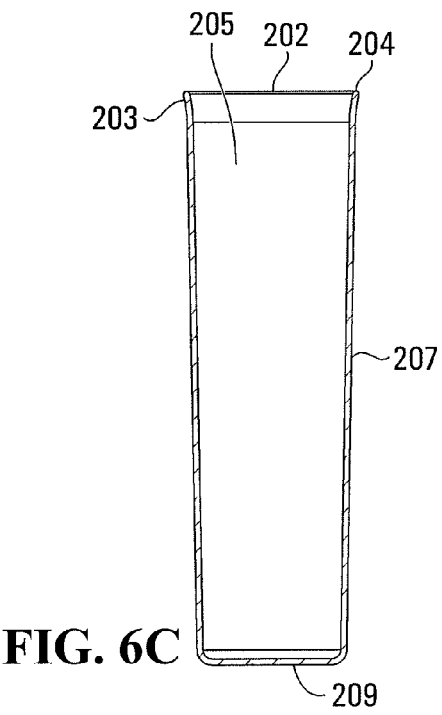
FIG. 6C is a elevation cross sectional view at section 6C-6C in FIG. 6B.

Set 1000 may also include one or more of variant inner vessels 201a, 201b which may be interchangeably substituted for inner vessel 201. Inner vessel 201a may have a wall 202a with substantially the same outer dimensions as inner vessel 201, and thus can be received within cavity 105 of outer vessel 101 (FIG. 2C). Wall 202a of inner vessel 201a has an upper-most portion 203a which may be substantially identical to upper-most portion 203 of inner vessel 101 (FIG. 6C). Upper-most portion 203a has a top edge 204a. Wall 202a defines a cavity 205a and has a series of openings 221. Upper-most portion 203a of wall 202a defines an opening to cavity 205a. Openings 221 are sized to allow fluid communication with cavity 205a therethrough, but to prevent passage of solid particles greater than a threshold size. As depicted, openings 221 are approximately 8 mm in diameter. Typically, openings 221 are between 6 mm and 8 mm in diameter. However, openings 221 may be larger or smaller, or may be of varying sizes.

Inner vessel 201b may be shaped similarly to inner vessel 201. Specifically, inner vessel 201b may be generally cylindrical, with substantially the same radius as inner vessel 201, and may taper slightly from top to bottom. Inner vessel 201b may be hollow, with a cavity 205 therein. Vessel 201 has an upper-most section 203b which defines an opening to cavity 205b. Upper-most section 203b defines an outwardly-extending rim. Upper-most section 203b is slightly wider than neck 103 of outer vessel 101 and thus can rest against neck 103 when inner vessel 201b is inserted in inner vessel 101 to support inner vessel 201b thereon. Inner vessel 201b may be substantially the same height as inner vessel 201, or may alternatively be shorter.

Inner vessel 201a may be formed from the same material as inner vessel 201, or may be formed from any of the materials identified above as being suitable for inner vessel 201. For example, inner vessel 201a may be made of glasses such as borcilite glass/borsilicate glass, ceramics, plastics (polymers) and the like.

Inner vessel 201b may be formed from any of the materials identified above as being suitable for outer vessel 101.

Set 1000 may also include one or more components which may be interchangeably substituted for cap 800, lid, 300, lid grip band 400 and sealing member 700 (collectively, lid assembly 1100). For example, set 1000 may include a sipper lid assembly 1100a.

Sipper lid assembly 1100a includes a sipper lid 1101, a stopper 1103 which may be hingedly attached to sipper lid 1101, and a seal 1105. The components of sipper lid assembly 1100a are depicted in greater detail in FIGS. 14A-14E.

Figure 14A:
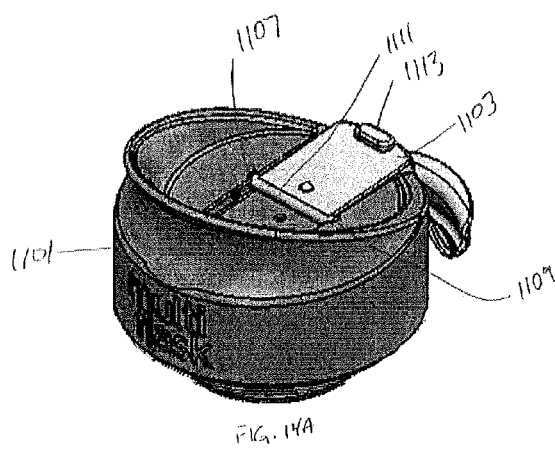
FIG. 14A is a perspective view of a lid assembly of the kit of FIG. 13.
Figure 14B:
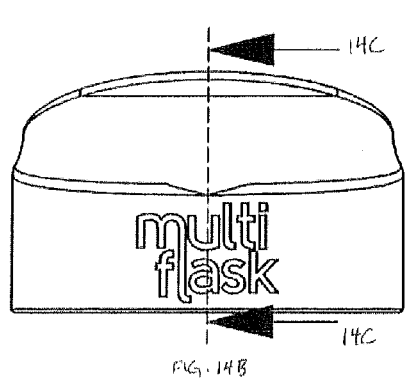
FIG. 14B is a front elevation view of the lid assembly of FIG. 14A.
Figure 14C:
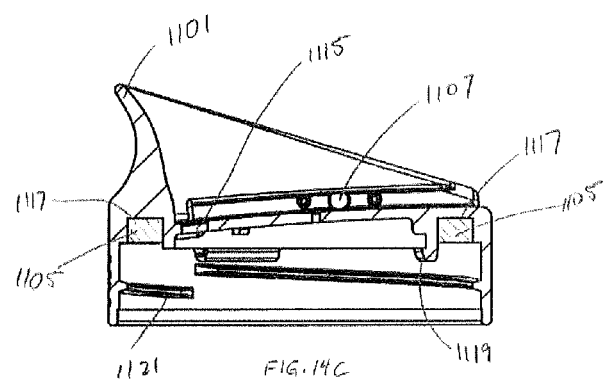
FIG. 14C is a cross-sectional view of the lid assembly of FIG. 14A along the line 14c-14c shown in FIG. 14B.
Figure 14D:
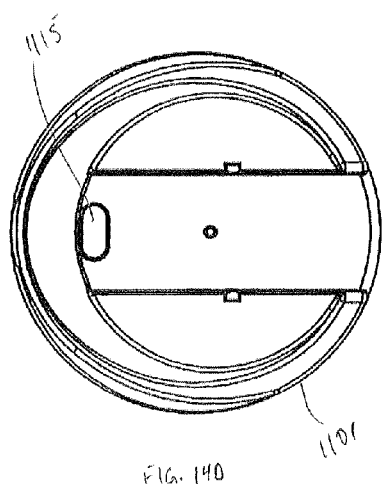
FIG. 14D is a top elevation view of the lid assembly of FIG. 14A.
Figure 14E:
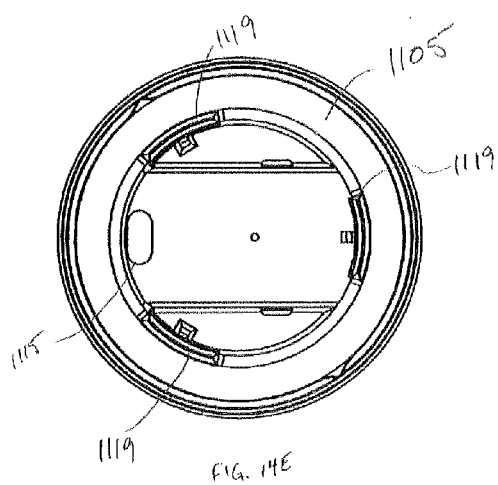
FIG. 14E is a bottom elevation view of the lid assembly of FIG. 14A.

FIG. 14A depicts sipper lid 1101 and stopper 1103 in perspective view. Sipper lid 1101 has a pair of cavities 1107 which receive projections 1109 of stopper 1103 to form a hinge 1111. Stopper 1103 may be rotated about hinge 1111 between an open position, shown in FIG. 14A, and a closed position. Stopper 1103 has a plug 1113 formed thereon which, when stopper 1103 is in a closed position, is received in an opening 1115 of sipper lid 1101 (FIG. 14D), thereby sealing opening 1115.

Sipper lid 1101 has an annular pocket 1117 defined in it its underside, sized to receive seal 1105. Sipper lid 1101 also has a set of downwardly-projecting clips 1119 on its underside. Clips 1119 are formed as arcs in an annular shape complementary to the shape of rim 505 of tea strainer 500 (FIGS. 9A-9E). Clips 1119 thus act as accessory retainers and can cooperate with a retention element of an accessory, such as rim 505, to form a releasable attachment mechanism to releasably retain an accessory like tea strainer 500 to sipper lid 1101.

Clips 1119 may alternatively be formed as a single annular clip like annular ring 705.

Sipper lid 1101 has internal threads 1121 which mate to threads on neck portion 103/103a to removably attach sipper lid 1101 to outer vessel 101/101a.

Sipper lid 1101 may be formed, for example, from relatively hard plastics, such as polypropylene, acrylonitrile butadiene styrene (ABS), high-density polyethylene and other similar plastics.

Seals 1105 may be formed, for example, from a suitable food-safe material such as those identified above as being suitable for seal spout 700 or base pad 600.

Figure 13:
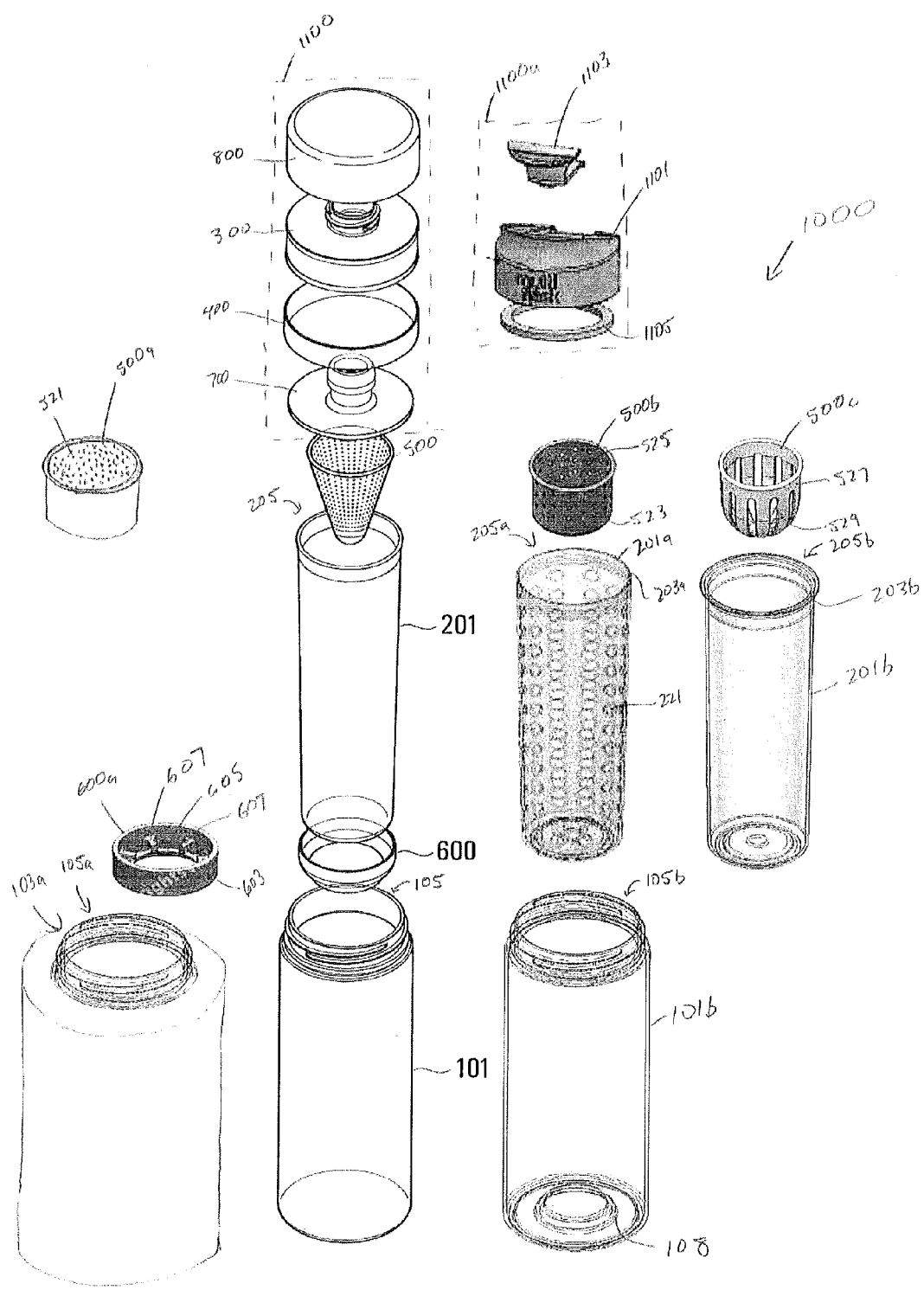
FIG. 13 is an exploded view of a set of container components.

Referring again to FIG. 13, set 1000 may also include one or more of a filter accessory 500a, a coarse strainer accessory 500b and an agitator accessory 500c (collectively, "accessories"), which are removably attachable to lid assembly 1100/1100a and which may be interchangeably substituted for tea strainer 500.

Figure 7A:
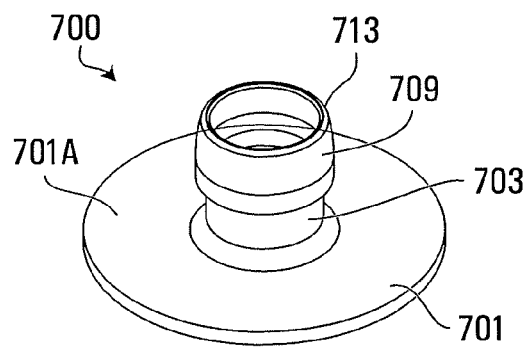
FIG. 7A is a perspective view of a part of the container of FIG. 1A.
Figure 7D:
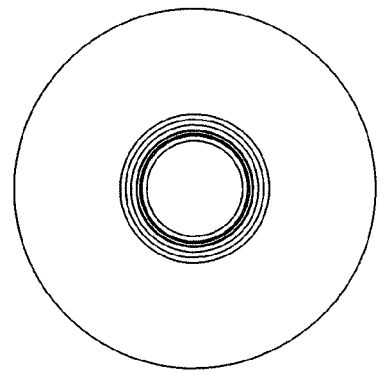
FIG. 7D is a top plan view of the part of FIG. 7A.
Figure 7B:
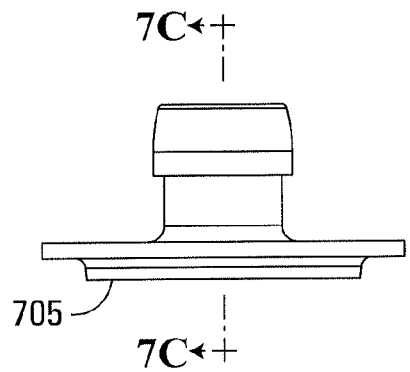
FIG. 7B is a front view of the part of FIG. 7A.
Figure 7C:
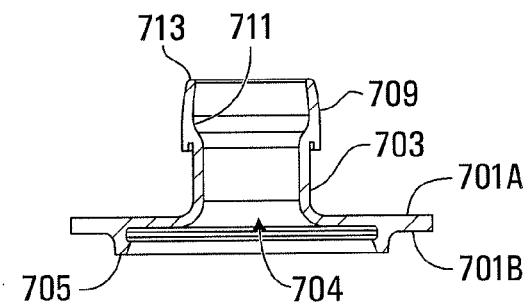
FIG. 7C is a elevation cross sectional view at section 7C-7C in FIG. 7B.

Filter accessory 500a, coarse strainer accessory 500b and agitator accessory 500c include rims 505a, 505b, 505c, respectively, each of which may be substantially identical in dimensions to rim 505 of tea strainer 500. Accordingly, filter accessory 500a, coarse strainer accessory 500b and agitator accessory 500c may be interchangeable with tea strainer 500 and can be removably attached to a lid assembly 1100/1100a by way of annular ring 705 (FIG. 7C), clips 1119 or clips of flip lid 1123.

Filter accessory 500a may be a water filter packed with a bed of activated carbon (not shown). Filter accessory 500a may have a plurality of inlet/outlet openings 521 to permit the flow of water therethrough. Such openings may, for example, be generally circular holes, slots, or a combination thereof.

Coarse strainer 500b has a generally cylindrical body 523 with a plurality of holes 525. Coarse strainer 500b may be used to support solids inside a liquid in the inner or outer vessel and to strain solids therefrom. For example, like tea strainer 500, coarse strainer 500b may be used to prepare tea. However, holes 525 are larger than the holes of tea strainer 500 and coarse strainer 500b may therefore be suitable for straining larger particles.

Agitator 500*c* has a body 527 with a dome-shaped end. Body 527 has a plurality of slots 529 extending radially outwardly and along its length. As is further explained below, slots 529 may be used to promote mixing.

Filter accessory 500*a*, coarse strainer 500*b* and agitator 500*c* may be formed, for example, from any material known in the art to be suitable for contact with hot beverages, including metals, plastics, composite materials and the like.

Set 1000 also includes a spring pad 600*a* which may be interchangeably substituted for pad 600. Spring pad 600*a* has an annular outer wall 603, a bottom wall 611 (FIG. 17D) which extends horizontally inwardly from the lower edge of wall 603 and a lip 605 which protrudes upwardly and inwardly from the bottom wall 611. A plurality of ribs 607 may extend radially inwardly from outer wall 603 and may be joined to lip 605. Wall 603 defines a pocket in which the bottom portion of inner vessel 201 may be received. Ribs 607 of spring pad 600*a* have upper surfaces 609 against which the bottom portion of inner vessel 201 may rest. Upper surfaces 609 may be flat and horizontal, or they may be shaped in another manner to cooperatively securely hold inner vessel 201. Thus, spring pad 600*a* may be inserted between outer vessel 101 and inner vessel 201 to support inner vessel 201 on inner vessel 101.

Wall 603, bottom wall 611 and lip 605 are shaped to generally conform to the shape of raised portion 108 of outer vessel 101*b*. That is, spring pad 600*a* may be inserted in outer vessel 101*b* such that bottom wall 611 abuts the bottom surface of outer vessel 101*b* surrounding raised portion 108, and raised portion 108 underlies lip 105. Spring pad 600*a* and ribs 607 may be sized so that, when inner vessel 201 is placed on spring pad 600*a* within outer vessel 101/101*a*/101*b*, the top edge of inner vessel 201 sits slightly above the top edge of outer vessel 101/101*a*/101*b*.

Spring pad 600*a* may be formed of a food-safe resiliently deformable material such that ribs 607 or lip 605 may buckle when subjected to force. Thus, ribs 607 or lip 605 may serve as a cushion to protect inner vessel 201 from impacts and prevent breakage. Spring pad 600*a* may, for example, be formed from any of the materials identified above as being suitable for pad 600.

Pad 600 or spring pad 600*a* may be used in a container when it is desired to provided shock absorption to protect inner vessel 201/201*a*/201*b*. For example, shock absorption may be desirable when the inner vessel is formed of glass or another relatively fragile material. On the other hand, if the inner vessel is formed from a more resilient material, it may not be necessary to use pad 600 or spring pad 600*a* for shock absorption.

For some combinations of inner vessels and outer vessels, pad 600 or spring pad 600*a* may be necessary to support the inner vessel so that the inner vessel's upper edge extends high enough to form a seal with the lid assembly. For example, pad 600 or pad 600*a* may be required when inner vessel 201*a* is used in conjunction with outer vessel 201.

Figure 18:
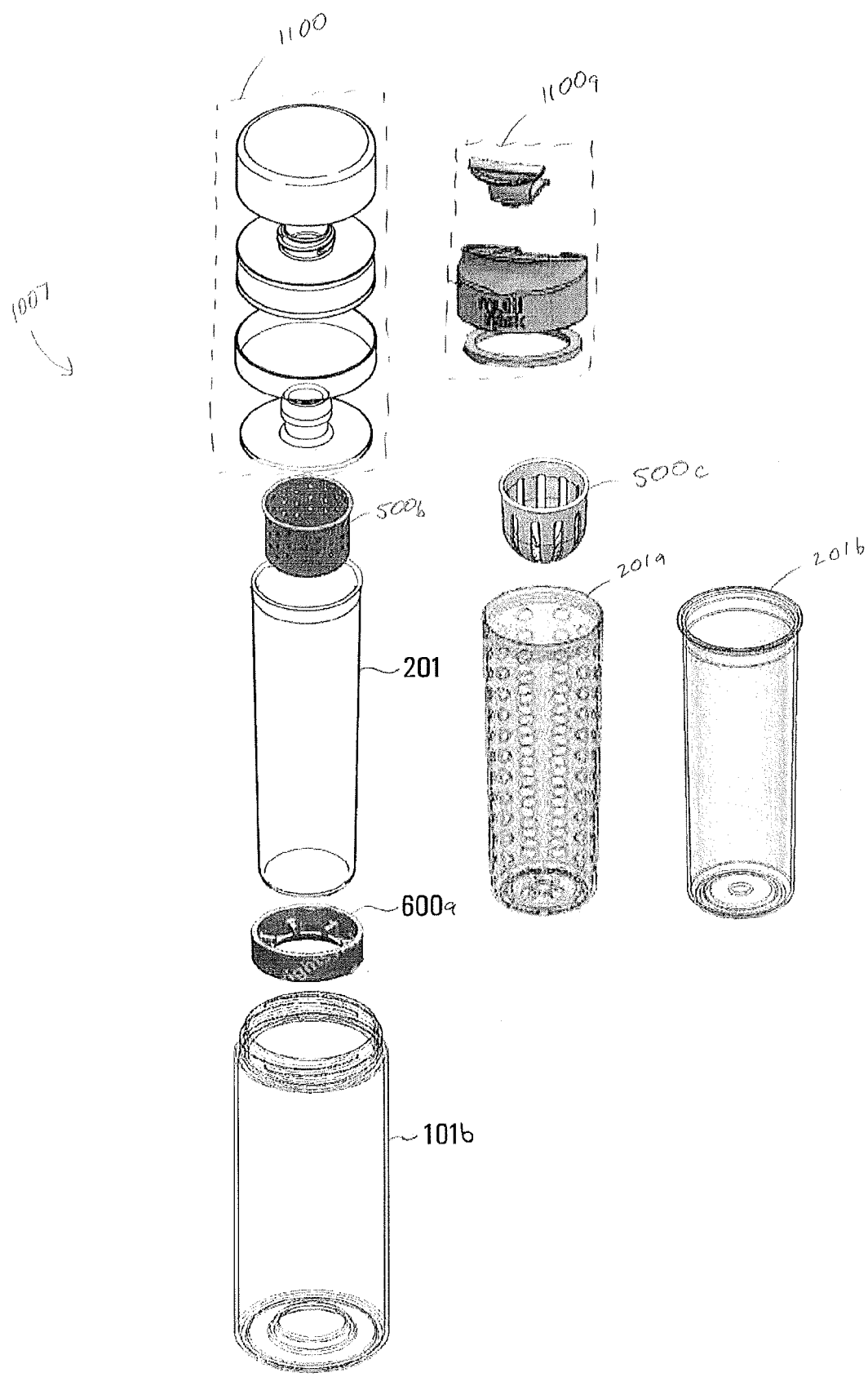
FIG. 18 is an exploded view of components of a container kit.

In some embodiments, subsets of the components of set 100 may be provided as kits which can be sold together to a consumer and used by a consumer to construct one or more possible containers. For example, kits may include only components selected to provide particular desired functions while avoiding additional costs associated with other components. FIG. 18 depicts one example kit 1007. Kit 1007 includes a single outer vessel 101*b*, a single base pad 600*a*, a inner vessels 201, 201*a*, 201*b*, coarse strainer 500*b* and agitator 500*c*, and lid assemblies 1100, 1100*a*. A variety of different kits can be formed using the components of set 1000. Kits may, for example, be any combination of components that includes at least one of outer vessels 101/101*a*/101*b*, one of inner vessels 201/201*a*/201*b*, one of lid assemblies 1100/1100*a*, one of accessories 500/500*a*/500*b*/500*c*, and at least one part interchangeably substitutable with the inner vessel, lid assembly or accessory.

FIGS. 15A-15D, 16A-16D and 17A-17D depict three example containers 1001, 1003, 1005 which may be formed from the components of kit 1007. The components used to form container 1005 depicted in FIGS. 17A-17D may be provided as another kit, suited for use with hot beverages.

Figure 15D:
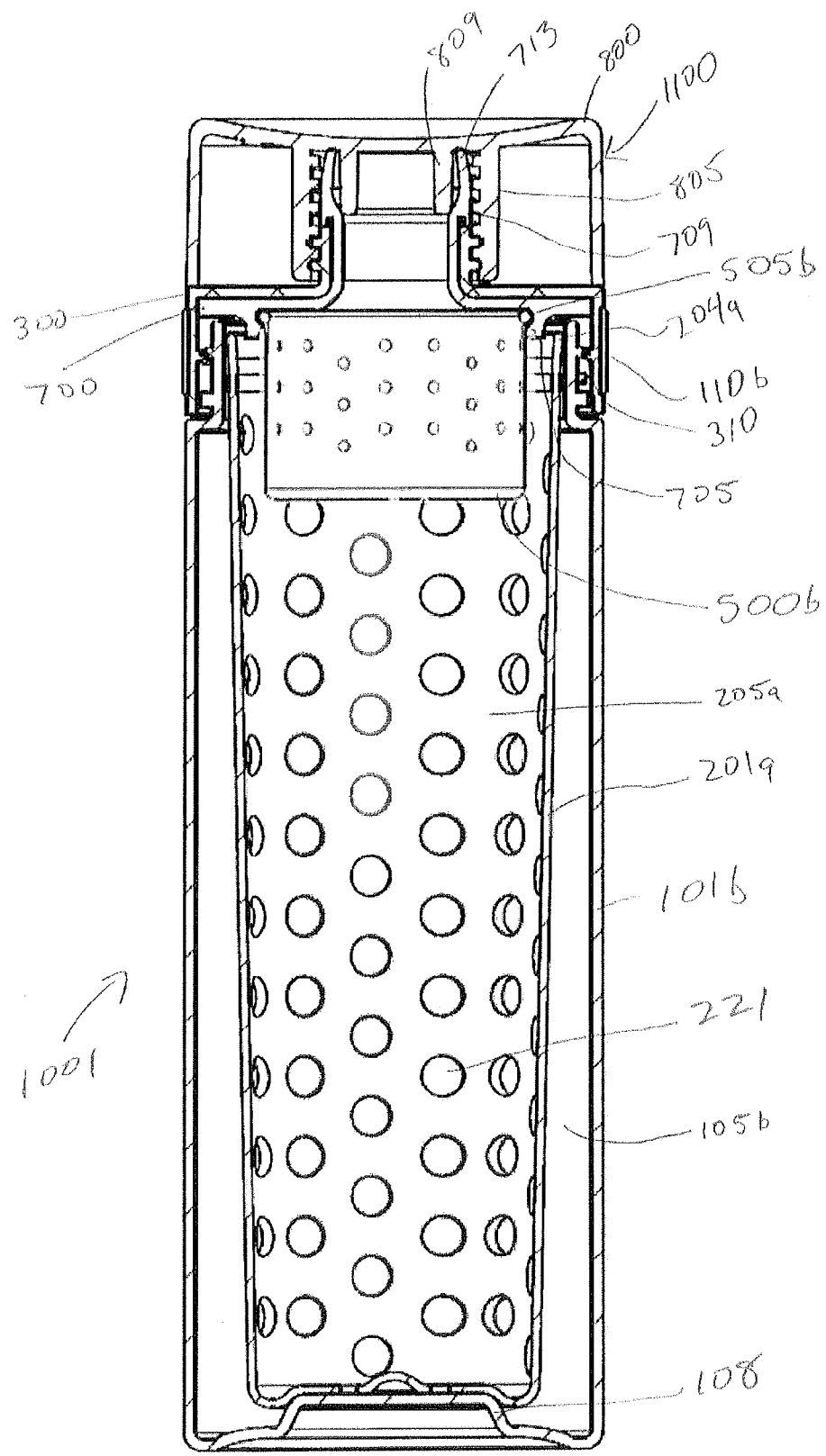
FIG. 15D is a cross-sectional view of the container of FIG. 15A along the line 15d-15d shown in FIG. 15C.

FIG. 15A depicts a first example container 1001 in perspective view. Container 1001 includes outer vessel 101*b*, inner vessel 201*a*, coarse strainer 500*b* and lid assembly 1100. The components of container 1001 are shown in exploded view in FIG. 15B. As best shown in FIG. 15D, the components of container 1001 are assembled in a similar manner to the components of container 100. Specifically, inner vessel 201*a* may be inserted in outer vessel 101*b* and received in its cavity 105*b*. Inner vessel 201*a* is supported on raised portion 108 of outer vessel 101*b* such that the openings to cavities 105*b* and 205*a* of outer vessel 101*b* and inner vessel 201*a*, respectively, are positioned proximate one another. The top edge of inner vessel 201*a* may extend approximately 2-3 mm above the top edge of outer vessel 101*b*.

Lid assembly 1100 may be assembled by press-fitting seal spout 700 into engagement with lid 300, installing grip band 400 over lid 300 and threading cap 800 onto lid 300. As cap 800 is tightened against lid 300, cap 800 forms a liquid-tight seal with seal spout 700, as top portion 713 and inner surface 711 of spout portion 709 contact cap 800. Coarse strainer 500*b* may be installed to lid assembly 1100 by pressing rim 505*b* of coarse strainer 500*b* into engagement with annular ring 705, such that annular ring 705 retains coarse strainer 500*b*. Lid assembly 1100 and coarse strainer 500*b* are then installed to outer vessel 101*b* by threading lid 300 onto neck portion 103. Tightening of lid 300 against neck portion 103 causes lower surface 701*b* of seal spout 700 to bear against the top edge 204*a* of inner vessel 201*a*, and the top edge of outer vessel 101*b*, sealing cavities 205*a*, 105*b*. With lid assembly 1100 tightened against neck portion 103 and coarse strainer 500*b* installed, coarse strainer 500*b* is received in inner vessel 201*a* and thus, in outer vessel 101*b*.

Because of openings 221 in inner vessel 201*a*, container 1001 may be suited to preparing infusions by immersing relatively large particles in a liquid contained in outer vessel 101*b*. For example, container 1001 may be used to prepare a fruit infusion by placing fruit within inner vessel 201*a* or by placing fruit between outer vessel 101*b* and inner vessel 201*a*.

Specifically, after inserting inner vessel 201*a* into outer vessel 101*b*, pieces of fruit, or other substances from which an infusion is to be prepared, may be inserted in inner vessel 201*a*. Water or another liquid may then be poured into outer vessel 101*b*, running over the fruit or other substance in inner vessel 201*a*. Coarse strainer 500*b* may then be installed to lid assembly 1100, which may then be threaded onto outer vessel 101*b*. The mixture inside the container may be allowed to steep for a period of time. The container may also be shaken to circulate the fluid therein. The resulting infusion may then be consumer without removing lid assembly 1100, inner vessel 201*a* or coarse strainer 500*b*. Accordingly, coarse strainer 500*b* may prevent large solid particles from passing through the spout of lid assembly 1100.

Container 1001 may instead be used without coarse strainer 500*b* if it is not desired to prevent solid particles from exiting the container when the infusion is being consumed. Alternatively, inner vessel 201a and any substances retained therein may be removed from outer vessel 101b prior to consumption. In a further mode of use, a substance from which an infusion is prepared may be placed between inner vessel 201a and outer vessel 101b.

As will be appreciated, container 1001 may also be used to prepare other types of infusions, or more generally, for straining solid particles from liquid held in vessel 101b, provided the solid particles are larger than openings 221.

FIGS. 16A-16D depict another example container 1003 which includes outer vessel 101, inner vessel 201b, agitator 500b, and sipper lid assembly 1100a, which includes lid 1101, stopper 1103 and seal 1105. The components of container 1003 are depicted in exploded view in FIG. 16B.

Figure 16C:
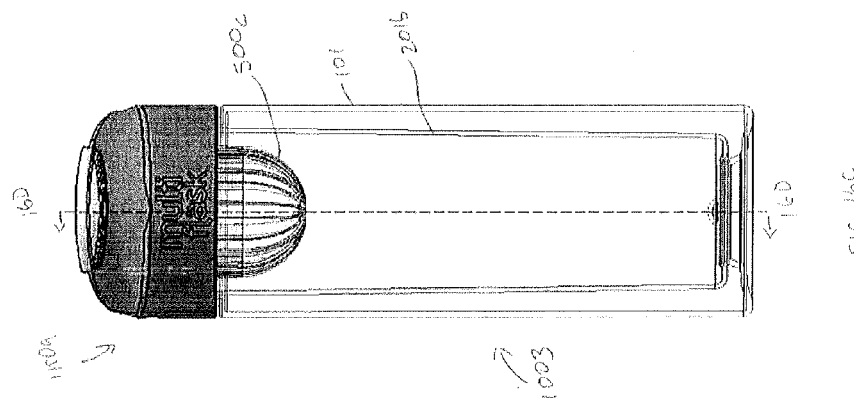
FIG. 16C is a side elevation view of the container of FIG. 16A.
Figure 16B:
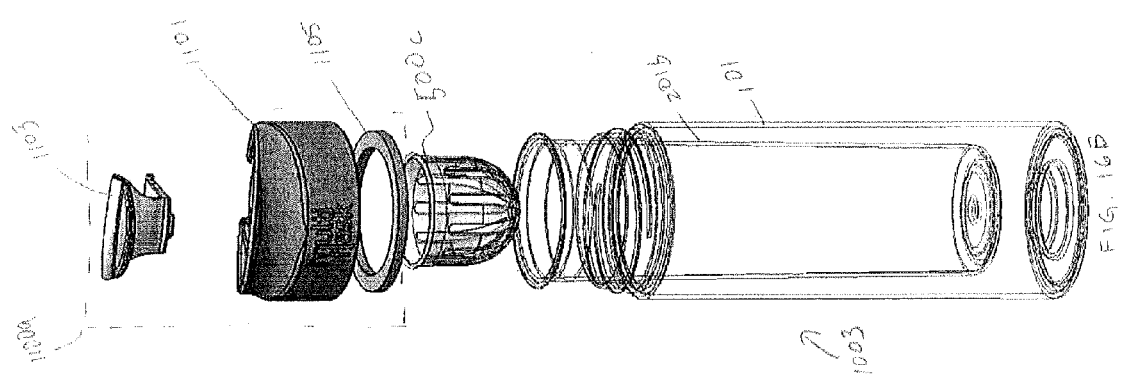
FIG. 16B is an exploded view of the container of FIG. 16A.
Figure 16A:
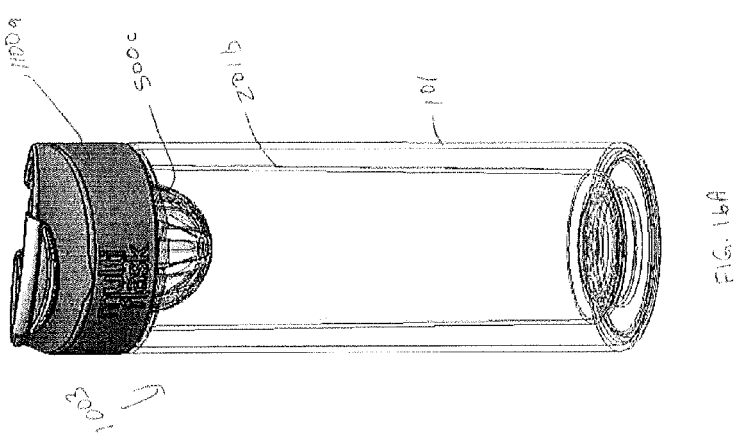
FIG. 16A is a perspective view of another container.
Figure 16D:
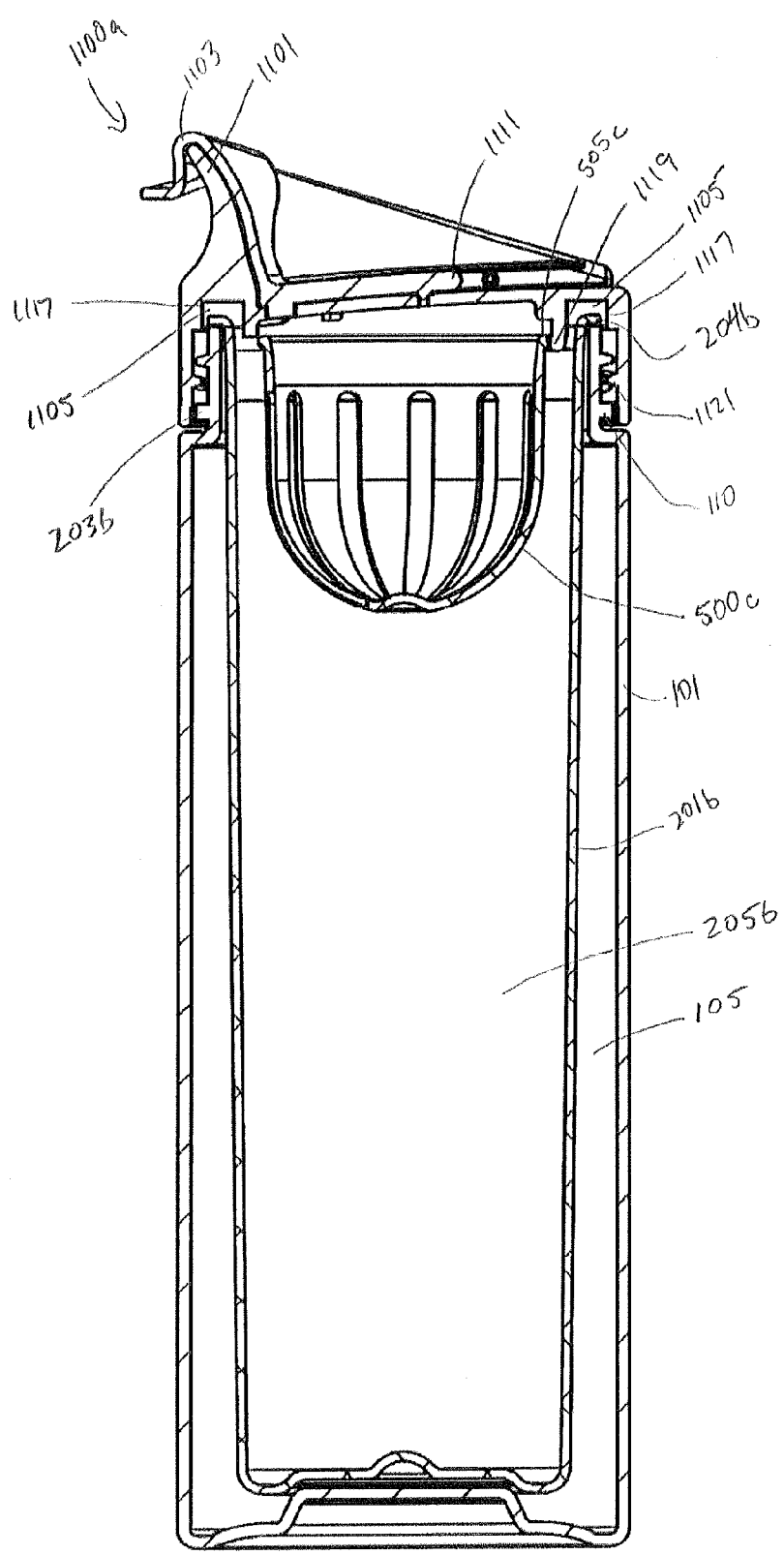
FIG. 16D is a cross-sectional view of the container of FIG. 16A along the line 16d-16d shown in FIG. 16C.

As depicted in FIG. 16D, inner vessel 201b may be inserted into cavity 105 of outer vessel 101 such that upper portion 203b of inner vessel 201b engages the top of neck portion 103 of outer vessel 101 and inner vessel 201b is thus supported on outer vessel 101. In this position, the openings to cavities 105, 205b of outer vessel 101 and inner vessel 201b, respectively, are positioned proximate one another.

Sipper lid assembly 1100a may be assembled by installing stopper 1103 to lid 1101 and inserting seal 1105 in pocket 1117 in the underside of lid 1101. Agitator 500c may then be installed to the underside of sipper lid assembly 1100a by inserting rim 505c into clips 1119 so that clips 1119 retain agitator 500c.

Sipper lid assembly 1100a may then be installed to outer vessel 101 by threading lid 1101 onto neck portion 103. With sipper lid assembly 1100a and agitator 500c installed, agitator 500c is received in inner vessel 201b and thus, in outer vessel 101. As threads 1121 of lid 1101 are tightened against threads 110 of neck portion 103, seal 1105 is brought into contact with and squeezes against top edge 204b of inner vessel 201b, forming a liquid-tight seal therewith, sealing cavity 205b. Top portion 203b of inner vessel 201b is simultaneously urged against the top of neck portion 103, which likewise seals the opening of cavity 105 of outer vessel 101.

Agitator 500c may be used to promote mixing within container 1003. Specifically, with agitator 500c installed, container 1003 may be shaken to cause movement of fluid within container 1003. Agitator 500c and slots 529 therein may cause flow perturbations in the moving fluid. This may promote mixing, e.g. dissolution of a solute such as a powdered beverage mix in water or another solvent.

FIGS. 17A-17D depict another example container 1005 which includes outer vessel 101b, inner vessel 201, spring pad 600a, coarse strainer 500b and sipper lid assembly 1100a. These components may also be provided to a consumer as a kit. The components of container 1005 are depicted in exploded view in FIG. 17B.

Figure 17D:
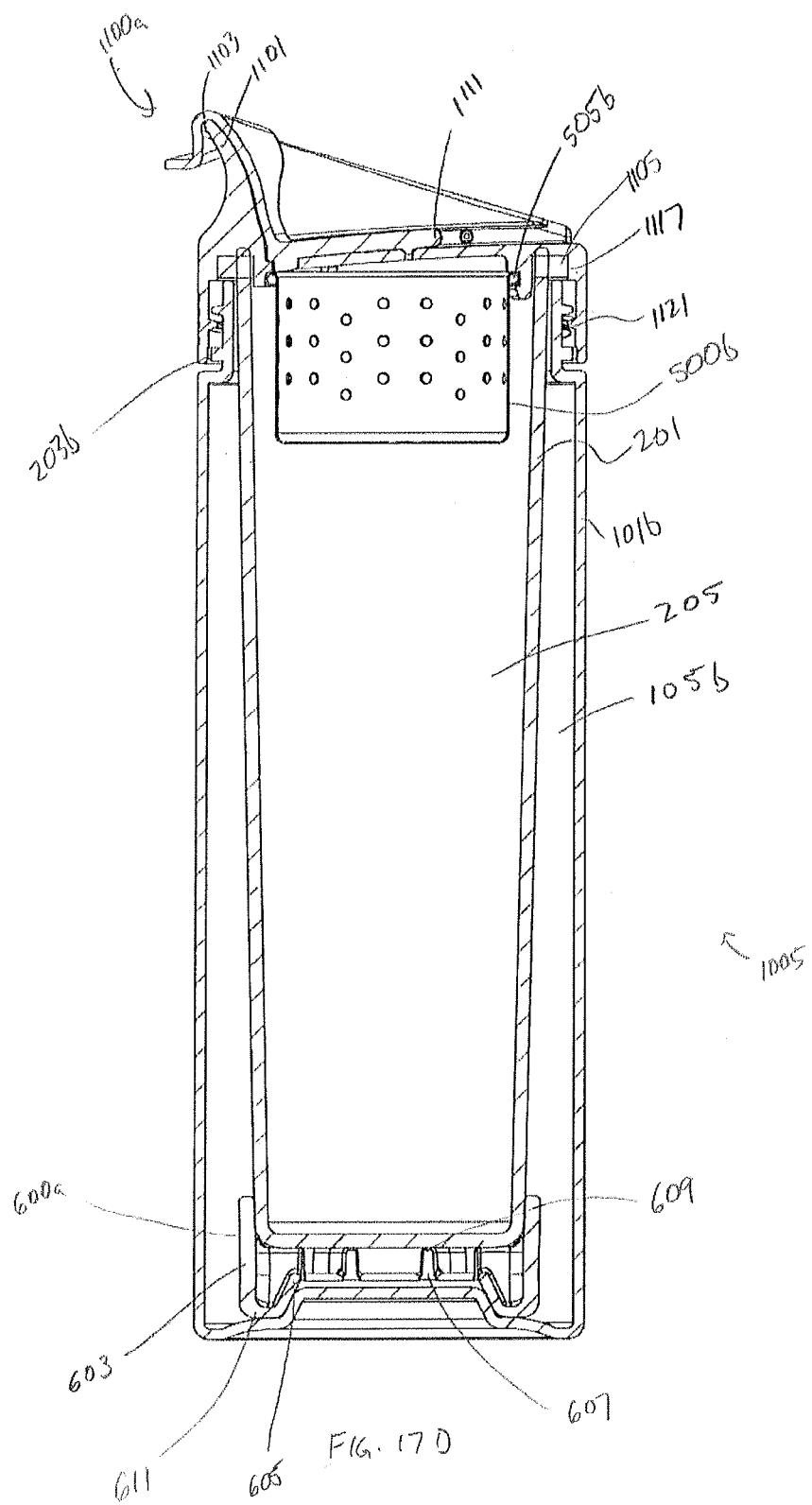
FIG. 17D is a cross-sectional view of the container of FIG. 17A along the line 17d-17d shown in FIG. 17C.

As depicted in FIG. 17D, sipper lid assembly 1100a is assembled as described above with reference to FIGS. 16A-16D. Coarse strainer 500b can be installed to lid assembly 100a if and when required by inserting rim 505b into clips 1119 so that clips 1119 retain coarse strainer 500b.

Spring pad 600a and inner vessel 201 are inserted in cavity 105b of outer vessel 101b, with spring pad 600a below inner vessel 201. As best depicted in FIG. 17D, the bottom portion of inner vessel 201 is received within a pocket defined by the top of wall 603 so that inner vessel 201 abuts top surfaces 609 of ribs 607. Bottom wall 611 sits in contact with outer vessel 101b to support inner vessel 201 thereon. When inner vessel 201 is supported by spring pad 600a on inner vessel 101b, the openings of cavities 105b, 205 of inner vessel 101b and outer vessel 201 are positioned proximate one another.

Inner vessel 201 may preferably be inserted into spring pad 600a prior to inserting inner vessel 201 and spring pad 601a into outer vessel 101b. This may ensure that inner vessel 201 seats properly into spring pad 601a in the position shown in FIG. 17D. However, spring pad 600a may alternatively be inserted into vessel 101b prior to inner vessel 201 being inserted into spring pad 600a.

Sipper lid assembly 1100a may be installed to outer vessel 101b by threading lid 1101 onto the neck portion thereof. This urges seal 1105 against the top of neck portion 103b and against top edge 204 of inner vessel 201, forming a liquid-tight seal between seal 1105 and both of inner vessel 201 and outer vessel 101b, sealing cavities 205, 105b, respectively.

Tightening of sipper lid assembly 1100a to outer vessel 101b may also urge inner vessel 201 against spring pad 600a. As noted, spring pad 600a may be formed of a resiliently deformable material such that ribs 607 or lip 605 are deformable members which may buckle or deflect downwardly to absorb shock when subjected to pressure by inner vessel 201. This may enable spring pad 600a to act as a shock absorber in the event of an impact to container 1005, dissipating energy. Thus, spring pad 600a may provide some protection against breakage of inner vessel 201 in the event of impact to container 1005. Buckling or deflection of ribs 607 or lip 605 may enable spring pad 600a to dissipate more energy than pad 600. Accordingly, pad 600a may allow container 1005 to withstand a relatively severe impact without inner vessel 201 sustaining damage.

As will be apparent, containers 1001, 1003 and 1005 are not exhaustive of the possible containers which may be constructed using the components of kit 1007. Similarly, containers 100, 1001, 1003, 1005 are not exhaustive of the possible containers which may be constructed using the components of set 1000. Rather, various subsets of components of set 1000 may be provided as different kits. Components in kits may be interchangeably substituted for one another to define the example containers described above or to define additional possible containers. Moreover, further interchangeable components may be added to set 1000. For example, set 1000 may include additional accessories which have a rim like rim 505/505a/505b/505c allowing installation to a lid assembly, and which are able to fit inside inner vessel 201 or outer vessel 101. Such additional accessories may be substituted for tea strainer 500, filter 500a, coarse strainer 500b and agitator 500c. Similarly, additional lid assemblies may be provided which have threads compatible with neck 103, and which are configured to engage and seal the openings of inner vessel 201 or outer vessel 101. Such lid assemblies may be interchangeable with lid assemblies 1100, 1100a. Further interchangeable substitutes for inner vessel 201 and outer vessel 101 may also be included.

Although not specifically described in detail herein, suitable modifications may be made to the embodiments described by persons skilled in the art. Of course, the foregoing embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed element.

What is claimed is:

1. A container kit, comprising:
an outer vessel having a first cavity, said first cavity having an opening;
an inner vessel having a second cavity, said second cavity having an opening, said inner vessel configured to be receivable in said first cavity such that said opening of said second cavity is positioned proximate said opening of said first cavity;
a lid assembly adapted to be removably attachable to said outer vessel;
a plurality of different interchangeable accessories;
a releasable attachment mechanism operable to interchangeably and removably attach each of said plurality of different interchangeable accessories to said lid assembly such that any selected one of said plurality of different interchangeable accessories may be releasably attached to said lid assembly such that said selected accessory is received in said first cavity when said lid assembly is attached to said outer vessel; and
at least one variant inner vessel comprising a wall defining a second cavity, said wall comprising a plurality of wall openings in fluid communication with said second cavity, said variant inner vessel configured to be receivable in said first cavity and interchangeable with said inner vessel so that a selected one of said inner vessel and said variant inner vessel can be received in said first cavity.

2. The container kit of claim 1, wherein said releasable attachment mechanism comprises an accessory retainer associated with said lid assembly and a retention member associated with each one of said accessories, said accessory retainer configured to interchangeably releasably attach to each said retention member of each of said plurality of different interchangeable accessories.

3. The container kit of claim 2, wherein said retention member of each of said plurality of different interchangeable accessories comprises a rim.

4. The container kit of claim 3, wherein said accessory retainer comprises a clip having a shape complementary to said rims of said retention members.

5. The container kit of claim 4, wherein each of said rims is annular in shape.

6. The container kit of claim 5, wherein said accessory retainer comprises a plurality of said clips.

7. The container kit of claim 1, wherein said lid assembly comprises a lid configured to be removably attachable to said outer vessel, and a seal assembly received in said lid to seal said opening of said first cavity and said opening of said second cavity when said lid is attached to said outer vessel.

8. The container kit of claim 1, wherein said plurality of different interchangeable accessories comprise a first strainer with holes of a first size, a second strainer with holes of a second size, different from said first size, an activated carbon filter, and an agitator for promoting mixing.

9. A container kit, comprising:
an outer vessel having a first cavity, said first cavity having an opening;
two interchangeable inner vessels, each having an second cavity having an opening, wherein each one of said interchangeable inner vessels is configured to be receivable in said first cavity so that a selected one of said interchangeable inner vessels can be received in said first cavity with said opening of the second cavity of that inner vessel positioned proximate said opening of said first cavity;
a lid assembly adapted to be removably attachable to said outer vessel;
a releasable attachment mechanism operable to removably attach an accessory to said lid assembly so that said accessory is received in said first cavity when said lid assembly is attached to said outer vessel,
wherein one of said two interchangeable inner vessels is of a different materials or has a different shape than the other.

10. The container kit of claim 9, wherein said releasable attachment mechanism comprises a rim of said accessory and a complementary retainer on said lid assembly.

11. The container kit of claim 9, wherein each of said inner vessels comprises a wall defining said second cavity, said wall of at least one of said inner vessels comprising a plurality of wall openings in fluid communication with said second cavity.

12. The container kit of claim 9, wherein each of said inner vessels is configured to be supported by said outer vessel when received in said first cavity.

13. The container kit of claim 10, wherein said outer vessel has a top edge defining said opening of said first cavity and at least one of said inner vessels has top edge defining said second opening and configured to rest against said top edge of said outer vessel when said inner vessel is received in said cavity.

14. The container kit of claim 9, wherein said lid assembly comprises a lid configured to be removably attachable to said outer vessel, and a seal assembly received in said lid to seal said first opening and said inner cavity opening when said lid is attached to said outer vessel.

15. The container kit of claim 9, comprising at least one variant accessory configured to be engageable by said releaseable attachment mechanism, said variant accessory interchangeable with said accessory so that a selected one of said accessory and said variant accessory can be releasably attached to said lid assembly.

16. The container kit of claim 15, wherein said accessory comprises a strainer with holes of a first size and said variant accessory comprises one of: a strainer with holes of a second size, different from said first size; an activated carbon filter; and an agitator for promoting mixing.

17. A container kit, comprising:
an outer vessel having a first cavity and an outer vessel opening;
an infusion vessel having a wall defining a second cavity and an inner vessel opening, said infusion vessel configured to be received through said outer vessel opening and supported on said outer vessel such that said inner vessel opening is positioned proximate said outer vessel opening, said wall comprising a plurality of holes in fluid communication with said second cavity;
a lid assembly comprising an accessory retainer and adapted to be removably attachable to said outer vessel to seal said outer vessel opening and said inner vessel opening;
an accessory comprising a retention element configured to engage said accessory retainer to removably attach said accessory to said lid assembly so that said accessory is received through said outer vessel opening when said lid assembly is attached outer vessel;
a variant vessel having an impermeable wall defining a variant vessel cavity and a variant vessel opening said variant vessel configured to be received through said outer vessel opening in place of said infusion vessel.

18. A container, comprising:
an outer vessel having a first cavity and an outer vessel opening;
an inner vessel having a wall defining a second cavity and an inner vessel opening, said inner vessel configured to be received through said outer vessel opening;
a pad having a wall defining a pocket to receive a bottom end of said inner vessel, and at least one deformable shock-absorbing member disposed beneath said inner vessel when said bottom end is received in said pocket;
a lid assembly comprising an accessory retainer and adapted to be removably attachable to said outer vessel to seal said outer vessel opening and said inner vessel opening;
an accessory comprising a retention element configured to engage said accessory retainer to removably attach said accessory to said lid assembly so that said accessory is received through said outer vessel opening when said lid assembly is attached outer vessel; and
a variant accessory interchangeable with said accessory,
wherein said accessory comprises a strainer with holes of a first size and said variant accessory comprises one of: a strainer with holes of a second size, different from said first size; an activated carbon filter; and an agitator for promoting mixing.

19. The container of claim 18, wherein said at least one deformable shock-absorbing member comprises a structure configured to absorb shock by buckling.

20. The container of claim 19, wherein said wall is generally annular and wherein said structure comprises a lip extending upwardly and radially inwardly from a bottom edge of said wall.

21. The container of claim 19, wherein said structure comprises at least one rib extending radially inwardly from said wall.

22. The container of claim 21, wherein said structure comprises a plurality of ribs extending radially inwardly from said wall, said ribs arranged to cooperatively support said inner vessel.

23. The container of claim 18, wherein said deformable shock-absorbing member comprises a layer of resiliently deformable material.

24. A container kit, comprising:
an outer vessel having a first cavity, said first cavity having an opening;
an inner vessel having a second cavity, said second cavity having an opening, said inner vessel configured to be receivable in said first cavity such that said opening of said second cavity is positioned proximate said opening of said first cavity;
a lid assembly adapted to be removably attachable to said outer vessel;
an accessory;
a releasable attachment mechanism operable to removably attach said accessory to said lid assembly such that said accessory is received in said first cavity when said lid assembly is attached to said outer vessel;
at least one variant component interchangeable with one of said inner vessel, and said accessory,
wherein said variant component comprises at least one of
a variant inner vessel configured to be receivable in said first cavity and interchangeable with said inner vessel so that a selected one of said inner vessel and said variant inner vessel can be received in said first cavity;
a variant inner vessel comprising a wall defining a second cavity, said wall comprising a plurality of wall openings in fluid communication with said second cavity;
an activated carbon filter; or
an agitator for promoting mixing.

\* \* \* \* \*